(12) United States Patent
Liu et al.

(10) Patent No.: US 11,275,357 B2
(45) Date of Patent: Mar. 15, 2022

(54) EVENT ANALYZING DEVICE, EVENT ANALYZING SYSTEM, EVENT ANALYZING METHOD, AND NON-TRANSITORY COMPUTER READABLE STORAGE MEDIUM

(71) Applicant: Yokogawa Electric Corporation, Musashino (JP)

(72) Inventors: Zhuo Liu, Tokyo (JP); Yuichi Sakuraba, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 574 days.

(21) Appl. No.: 15/883,189

(22) Filed: Jan. 30, 2018

(65) Prior Publication Data

US 2018/0224831 A1 Aug. 9, 2018

(30) Foreign Application Priority Data

Feb. 8, 2017 (JP) .............................. JP2017-021435

(51) Int. Cl.
*G05B 19/418* (2006.01)
*G05B 23/02* (2006.01)
*G01D 9/00* (2006.01)

(52) U.S. Cl.
CPC ......... *G05B 19/4183* (2013.01); *G01D 9/005* (2013.01); *G05B 23/0232* (2013.01); *G05B 2219/31318* (2013.01); *Y02P 90/02* (2015.11)

(58) Field of Classification Search
None
See application file for complete search history.

(56) References Cited

U.S. PATENT DOCUMENTS

| 5,339,257 A | * | 8/1994 | Layden .............. G05B 19/4184 |
| | | | 702/84 |
| 6,230,064 B1 | | 5/2001 | Nakase et al. |
| 7,023,440 B1 | | 4/2006 | Havekost et al. |

(Continued)

FOREIGN PATENT DOCUMENTS

| JP | 11-25169 A | 1/1999 |
| JP | 2010-122847 A | 6/2010 |

(Continued)

*Primary Examiner* — Lina M Cordero
(74) *Attorney, Agent, or Firm* — Sughrue Mion, PLLC

(57) ABSTRACT

An event analyzing device includes an event data collector configured to collect event data which represents an event including an alarm which has occurred in a plurality of devices in a plant and an operation performed to the devices, a process data collector configured to collect process data of the devices in the plant, a trend change detector configured to detect a trend change of the process data collected by the process data collector, an event data converter configured to convert the trend change detected by the trend change detector into a process change event represented in the same format as the event, and a cause-effect relationship analyzer configured to integrate the event data collected by the event data collector and process change event data which represents the trend change in the process change event converted by the event data converter to analyze a cause-effect relationship between the event and the process change event.

10 Claims, 10 Drawing Sheets

(56) References Cited

U.S. PATENT DOCUMENTS

| | | | | |
|---|---|---|---|---|
| 7,031,878 B2 * | 4/2006 | Cuddihy | ............ | H04L 43/00 |
| | | | | 701/100 |
| 7,526,405 B2 * | 4/2009 | Miller | ............ | G05B 23/024 |
| | | | | 382/144 |
| 7,672,811 B2 * | 3/2010 | Xiao | ............ | G05B 23/0232 |
| | | | | 702/185 |
| 8,174,402 B2 * | 5/2012 | Bouse | ............ | G05B 19/4065 |
| | | | | 340/679 |
| 8,195,426 B1 | 6/2012 | Antanies | | |
| 8,838,417 B2 * | 9/2014 | Rikkola | ............ | G05B 23/02 |
| | | | | 702/188 |
| 2005/0240382 A1 * | 10/2005 | Nakaya | ............ | G05B 19/41885 |
| | | | | 703/6 |
| 2008/0243328 A1 * | 10/2008 | Yu | ............ | G05B 23/0232 |
| | | | | 701/31.2 |
| 2011/0264424 A1 | 10/2011 | Miwa et al. | | |
| 2014/0188779 A1 | 7/2014 | Sakuraba | | |
| 2014/0317040 A1 * | 10/2014 | Liu | ............ | G06K 9/6296 |
| | | | | 706/46 |
| 2015/0301882 A1 * | 10/2015 | Liao | ............ | G06F 11/0709 |
| | | | | 714/47.3 |
| 2018/0018570 A1 | 1/2018 | Mizoguchi | | |
| 2018/0158314 A1 * | 6/2018 | Larsson | ............ | G08B 29/26 |
| 2018/0329398 A1 * | 11/2018 | Hoernicke | ............ | G05B 19/41845 |

FOREIGN PATENT DOCUMENTS

| | | |
|---|---|---|
| JP | 2014-127093 A | 7/2014 |
| WO | 2009/034000 A1 | 3/2009 |
| WO | 2016/111240 A1 | 7/2016 |

* cited by examiner

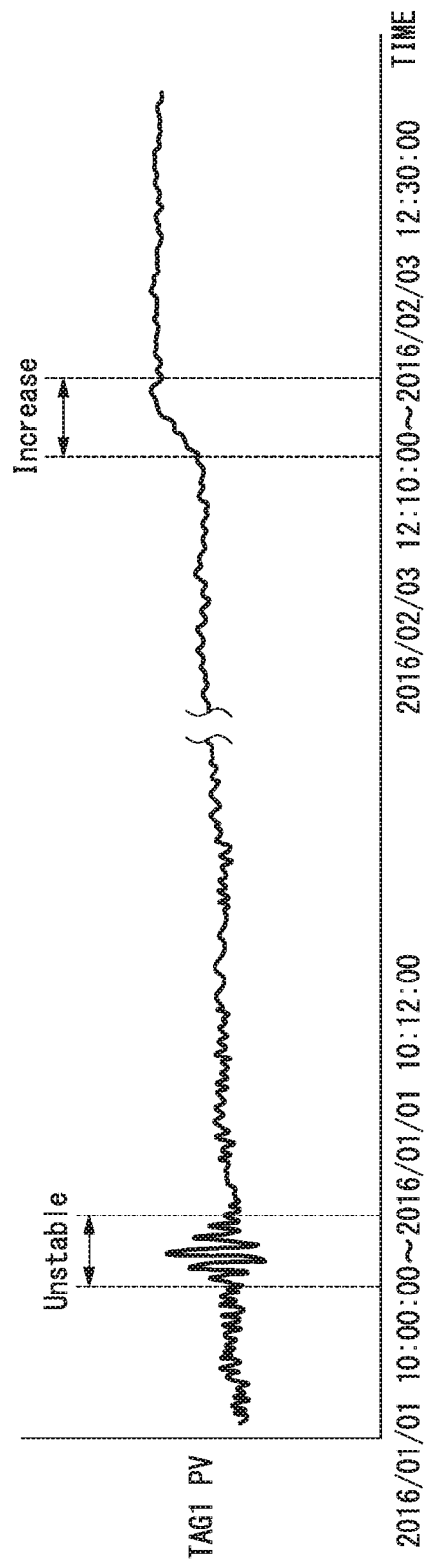

FIG. 5A

| DATE AND TIME | TAG NAME | IDENTIFIER | TYPE |
|---|---|---|---|
| 2016/01/01 10:01:00 | TAG2 | MAN | Operation |
| 2016/01/01 10:03:05 | TAG2 | MV | Operation |
| 2016/01/01 10:04:00 | TAG1 | HI | Alarm |
| 2016/01/01 10:04:30 | TAG2 | MV | Operation |
| 2016/01/01 10:06:30 | TAG2 | MV | Operation |
| 2016/01/01 10:08:00 | TAG2 | MV | Operation |
| 2016/01/01 10:09:00 | TAG2 | AUT | Operation |
| ... | ... | ... | ... |

FIG. 5B

| START TIME | END TIME | TAG NAME | IDENTIFIER | TYPE |
|---|---|---|---|---|
| 2016/01/01 10:01:00 | 2016/01/01 10:01:00 | TAG2 | MAN | Operation |
| 2016/01/01 10:03:05 | 2016/01/01 10:08:00 | TAG2 | MV | Operation |
| 2016/01/01 10:04:00 | 2016/01/01 10:04:00 | TAG1 | HI | Alarm |
| 2016/01/01 10:09:00 | 2016/01/01 10:09:00 | TAG2 | AUT | Operation |
| ... | ... | ... | ... | ... |

FIG. 6

| START TIME | END TIME | TAG NAME | IDENTIFIER | TYPE |
|---|---|---|---|---|
| 2016/01/01 10:00:00 | 2016/01/01 10:12:00 | TAG1 | Unstable | Trend |
| 2016/01/01 10:01:00 | 2016/01/01 10:01:00 | TAG2 | MAN | Operation |
| 2016/01/01 10:03:05 | 2016/01/01 10:08:00 | TAG2 | MV | Operation |
| 2016/01/01 10:04:00 | 2016/01/01 10:04:00 | TAG1 | HI | Alarm |
| 2016/01/01 10:09:00 | 2016/01/01 10:09:00 | TAG2 | AUT | Operation |
| ... | ... | ... | ... | ... |
| 2016/02/03 12:10:00 | 2016/02/03 12:30:00 | TAG1 | Increase | Trend |
| ... | ... | ... | ... | ... |

EVENT ANALYZING DEVICE, EVENT ANALYZING SYSTEM, EVENT ANALYZING METHOD, AND NON-TRANSITORY COMPUTER READABLE STORAGE MEDIUM

BACKGROUND

Technical Fields

The present invention relates to an event analyzing device, an event analyzing system, an event analyzing method, and a non-transitory computer readable storage medium.

Priority is claimed on Japanese Patent Application No. 2017-021435, filed Feb. 8, 2017, the contents of which are incorporated herein by reference.

Related Art

In a plant having various facilities, for the purpose of monitoring the operation states of the facilities arranged inside the plant or controlling the operations of the facilities, a plurality of field devices (measuring devices and operation devices) are installed. The field devices, for example, are controlled by a control apparatus installed in a control room controlling the operations of the facilities. In addition, in a plant, control apparatuses, for example, are interconnected through a dedicated communication network built inside the plant, and a control system such as a distributed control system (DCS) is built.

In a general distributed control system, information of an event such as an alarm of facilities or an operation for facilities is collected as event data, and a history (log) of collected event data is recorded in an event data log. An event of an alarm of facilities is, for example, an alarm issued by a field device on the basis of measured data or the like, and event data for this event is information relating to the issued alarm or the like. In addition, an event of an operation for facilities is, for example, an operation of a setting change for facilities or the like performed in accordance with the operation state of the facilities by an operator such as a worker performing control or maintenance of the operation of the facilities in a plant, and event data for this event is information representing content of an operation performed for facilities by an operator or content of a changed setting. In a distributed control system, for each issuance of an alarm or each performed operation, in other words, for each one event, event data representing an issued alarm or a content of a performed operation is recorded in an event data log.

The event data log stored in this distributed control system is analyzed for the purpose of safe operation in a plant or improvement of operation. For the analysis of an event data log, an event analyzing device is used. In a conventional event analyzing device, a statistical analysis relating to the number of pieces of event data included in an event data log, in other words, the number of occurrences of events or the like, is performed. In recent years, in event analyzing devices, a relation between event data of a plurality of different kinds included in an event data log, in other words, an analysis of a cause-effect relationship of different events is also performed.

For example, in Japanese Unexamined Patent Application Publication No. 2014-127093, a technology of an event analyzing device performing an analysis of a cause-effect relationship among events has been proposed. In the event analyzing device disclosed in Japanese Unexamined Patent Application Publication No. 2014-127093, for example, a cause-effect relationship between an event of interest for a user using the event analyzing device such as a supervisor supervising the operations of facilities and different events can be analyzed. For example, in the event analyzing device disclosed in Japanese Unexamined Patent Application Publication No. 2014-127093, by analyzing a cause-effect relationship between an alarm generated in a plant and an operator's operation and each event, a relating event can be extracted. More specifically, in a case in which it can be known that an operator's operation stored as an event is due to a generated alarm from a result of the analysis of the cause-effect relationship in the event analyzing device disclosed in Japanese Unexamined Patent Application Publication No. 2014-127093, the operator's operation can be extracted as an operator's operation (event) that is necessary for responding to the alarm. In addition, in a case in which it can be known that an alarm stored as an event is due to an operator's operation from a result of the analysis of the cause-effect relationship in the event analyzing device disclosed in Japanese Unexamined Patent Application Publication No. 2014-127093, this alarm can be extracted as an alarm (event) predicted to be generated after an operator's operation.

In a plant to which the event analyzing device disclosed in Japanese Unexamined Patent Application Publication No. 2014-127093 is applied, on the basis of a result of the analysis of the cause-effect relationship, estimation of a cause of an abnormality (issue of an alarm), setting of conditions at the time of issue of an alarm, improvement of an operation that is manually performed for each facility by an operator, and the like can be performed. For example, in a case in which events of a plurality of alarms, which have strong cause-effect relationship, occurring in a chain reaction are extracted as a result of an analysis of a cause-effect relationship using the event analyzing device disclosed in Japanese Unexamined Patent Application Publication No. 2014-127093, a cause of an abnormality (alarm) can be estimated (specified) by tracing the chains of field devices in which the alarms have been generated, or the number of occurrences of events of alarms can be rationalized to be decreased by changing the settings of alarms in each field device in which an alarm has occurred. In addition, in a case in which an event of an operator's operation that is necessary according to the generation of a specific alarm is extracted (specified) as a result of an analysis of a cause-effect relationship using the event analyzing device disclosed in Japanese Unexamined Patent Application Publication No. 2014-127093, by taking measures like automatic execution of the extracted (specified) operation in a case in which the same alarm is generated thereafter, an operation performed by the operator may be automated.

However, in a plant, a generated alarm and an operator's operation cannot be determined to necessarily have a relation (a cause-effect relationship). In other words, an operation performed by an operator in a plant cannot necessarily be determined to be due to the occurrence of an alarm. In a plant, in various processes performed in each facility, for example, an operator performs operation control and a maintenance operation of facilities while checking the trend of data measured by each field device or the like. At this time, in a case in which the value (hereinafter, referred to as a "process value") of data in a process is to be unstable and deviates from the range of a target process value in a normal process based on the checked trend of data, there are also cases in which the operator performs a corresponding operation before the generation of an alarm. In other words, in a case in which an operator senses a sign of a change (variation) in the process value for which an alarm is predicted to occur in the future, there are cases in which the operator performs a corresponding operation in advance even in a state in which an alarm is not generated.

In the event analyzing device disclosed in Japanese Unexamined Patent Application Publication No. 2014-127093, although a cause-effect relationship between an event of a generated alarm and an event of an operator's operation can be analyzed, an analysis including an operator's operation having no cause-effect relationship with an alarm as described above cannot be performed. In other words, for an event of an operator's operation having no cause-effect relationship with an event of an alarm, the event analyzing device disclosed in Japanese Unexamined Patent Application Publication No. 2014-127093 cannot perform an analysis of a process state of a facility for which the operator has performed an operation, the influence of the operation performed by the operator on the process value according to a change of the process, and the like. For this reason, the event analyzing device disclosed in Japanese Unexamined Patent Application Publication No. 2014-127093 cannot extract another event relating to an event having no cause-effect relationship with the event of an alarm focused by the user.

In addition, in a plant, it cannot be determined that an alarm is necessarily generated after an operation is performed by an operator. For example, in a plant, even in a case in which a process is changed in accordance with an operation performed by the operator for each facility, and a change in the process value appears according to the influence of the changed process, an alarm may not be generated. The reason for this is that, generally, an operator performs an operation for a facility such that the process is performed normally in the facility, in other words, an alarm is not generated. In addition, in a plant, since an alarm is set for each field device installed in each facility (for example, a setting of an alarm of a field device relating to the same process is not changed in order of the process), even in a case in which the influence of a process changed according to an operation performed by the operator sequentially propagates to facilities of later stages, it cannot be determined that alarms in the facilities are necessarily generated sequentially (in a chain reaction).

However, while the event analyzing device disclosed in Japanese Unexamined Patent Application Publication No. 2014-127093, by extracting events of a plurality of alarms occurring in a chain reaction, can estimate the cause of an abnormality (alarm) or rationalize the alarm by tracking the chain of the alarms, as described above, events of a plurality of alarms cannot be extracted by tracing the chain for an alarm according to a change in the process value influenced by an operator's operation having no cause-effect relationship with an alarm. In other words, the event analyzing device disclosed in Japanese Unexamined Patent Application Publication No. 2014-127093 cannot perform an analysis including a change in the process value appearing according to the influence of an operator's operation having no cause-effect relationship with an event of an alarm.

For this reason, a plant to which the event analyzing device disclosed in Japanese Unexamined Patent Application Publication No. 2014-127093 is applied cannot estimate the cause of an abnormality (alarm), rationalize the alarm, or automate the operation that is manually performed by the operator by performing an analysis including an operator's operation having no cause-effect relationship with an alarm.

In an event analyzing device, in order to perform an analysis including an operator's operation having no cause-effect relationship with an alarm, it is necessary to perform an analysis of a cause-effect relationship including not only an event of a generated alarm and an operator's operation but also a change in the operation state of a process, in other words, a change in the process value.

In addition, conventionally, a method of analyzing relation between processes by acquiring correlations or the like of time-series process values in a plurality of processes is known. However, in the conventional method of analyzing relation between processes, the relation between processes is analyzed based on only time-series process values, and accordingly, unlike the event analyzing device disclosed in Japanese Unexamined Patent Application Publication No. 2014-127093, an analysis including events of a generated alarm, an operator's operation, and the like is not performed. In other words, a technology (method) of analyzing a cause-effect relationship including a generated alarm, an operator's operation, and a change in the operation state of the process has not been disclosed.

SUMMARY

An event analyzing device may include an event data collector configured to collect event data which represents an event including an alarm which has occurred in a plurality of devices in a plant and an operation performed to the devices, a process data collector configured to collect process data of the devices in the plant, a trend change detector configured to detect a trend change of the process data collected by the process data collector, an event data converter configured to convert the trend change detected by the trend change detector into a process change event represented in the same format as the event, and a cause-effect relationship analyzer configured to integrate the event data collected by the event data collector and process change event data which represents the trend change in the process change event converted by the event data converter to analyze a cause-effect relationship between the event and the process change event.

Further features and aspects of the present disclosure will become apparent from the following detailed description of exemplary embodiments with reference to the attached drawings.

BRIEF DESCRIPTION OF THE DRAWINGS

FIGS. 4A and 4B are diagrams illustrating one example of a process of detecting a change in the trend of process data and a process of generating process variation event data in an event analyzing device according to an embodiment of the present invention;

FIGS. 5A and 5B are diagrams illustrating an example of a process of generating continued event data by aggregating event data collected by an event analyzing device according an embodiment of the present invention;

FIG. 6 is a diagram illustrating on example of event data integrated by an event analyzing device according to an embodiment of the present invention;

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide an event analyzing device, an event analyzing system, an event analyzing method, and a non-transitory computer readable storage medium capable of analyzing a cause-effect relationship by combining events of a variation in data of a process performed in each facility arranged inside a plant, an alarm of a facility, an operation for a facility, and the like.

Figure 1:
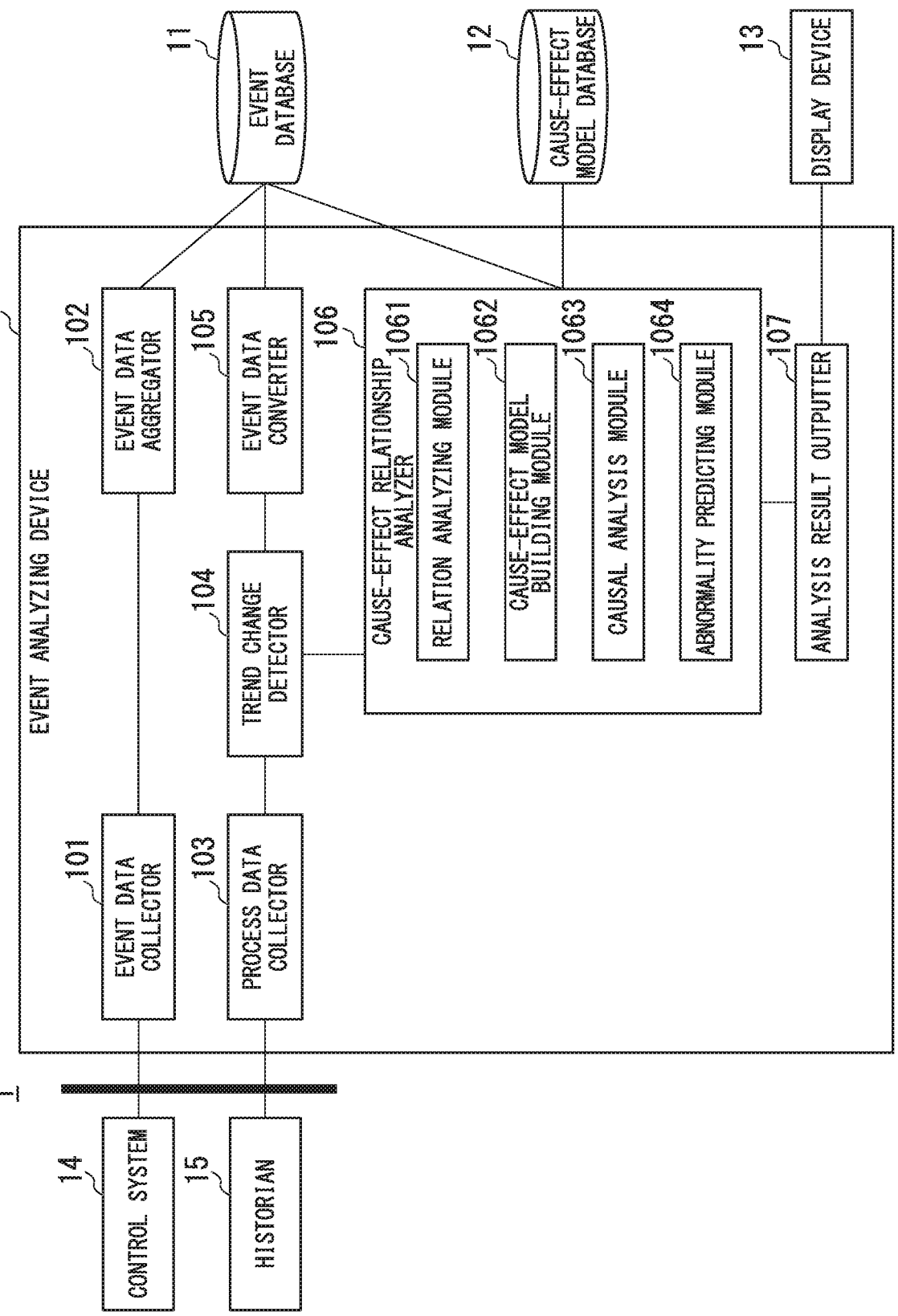
FIG. 1 is a block diagram illustrating the schematic configuration of an event analyzing system including an event analyzing device according to an embodiment of the present invention.

Hereinafter, embodiments of the present invention will be described with reference to the drawings. FIG. 1 is a block diagram illustrating the schematic configuration of an event analyzing system including an event analyzing device according to an embodiment of the present invention. As illustrated in FIG. 1, the event analyzing system 1 includes an event analyzing device 10, an event database 11, a cause-effect model database 12, a display device 13, a control system 14, and a historian 15.

The event analyzing system 1 is a system analyzing various cause-effect relationships among various events inside a plant by integrating data of events (hereinafter, referred to as "event data") of facilities arranged inside the plant collected by the control system 14, the historian 15, and the like (for example, also including events of the control system 14) and data of various processes (hereinafter, referred to as "process data") performed by the facilities. As the plant, in addition to an industrial plant performing petroleum refining or production of chemical products, a plant that manages and controls a well site of a gas field, an oil field, or the like and the surroundings thereof, a plant that manages and controls hydroelectric power generation, thermal power generation, nuclear power generation, or the like, a plant that manages and controls environmental power generation such as solar power generation and wind power generation, or the like, and a plant that manages and controls water supply and sewerage, a dam, or the like are included.

The control system 14 is a control system that controls the operations facilities arranged inside a plant. The control system 14 is, for example, built as a distributed control system (DCS) inside a plant. The control system 14 acquires event data and process data, for example, from control devices such as field devices, which are not illustrated in the drawing, installed in target facilities to be controlled, an operation device, which is not illustrated in the drawing, corresponding to facilities that are targets to be controlled, and the like. In addition, as devices from which event data and process data are acquired by the control system 14, while various devices other than the field devices (control devices) and the operation devices described above may be considered, in description presented below, the control system 14 will be described as acquiring event data and process data from field devices and operation devices.

Here, a field device is a field device such as a measuring device having a measuring function of measuring an operation state (for example, a pressure value, a temperature, a flow rate, or the like) at the time of operating installed facilities and a diagnosing function of diagnosing the operation state of facilities on the basis of a measurement result or an operation device having a control function (for example, an actuator or the like) of controlling the operation of installed facilities in accordance with an input control signal.

A field device sequentially outputs data of measured values (for example, pressure values, temperatures, flow rates, or the like) acquired by measuring the operation states of installed facilities using the measuring function to the control system 14 as process data of processes performed in the facilities. In addition, the process data also includes information of kinds of output measured values (for example, a pressure value, a temperature, a flow rate, or the like). In the process data, information such as a tag name assigned for identifying its own field device is associated. In addition, measured values output as process data may include not only measured values acquired by a field device through measurements but also calculated values acquired through calculation on the basis of the measured values. The calculation of calculated values from measured values may be performed by a field device or an external device, which is not illustrated in the drawing, connected to the field device.

In addition, in a case in which it is diagnosed to be necessary to notify of an abnormal operation state of installed facilities such as a case in which, as a result of diagnosis of a measured value acquired using a measuring function that is acquired using the diagnosing function, for example, the measured value is not within a range set in advance, the field device issues an alarm using a lamp or a sound to give a notification to the periphery thereof. At this time, the field device outputs information representing the issuance of an alarm to the control system 14 as event data (hereinafter, referred to as "alarm event data") of an event of an alarm (hereinafter, referred to as an "alarm event") in the facilities. The alarm event data also includes information representing the kind of an alarm (for example, an upper limit value is exceeded, a lower limit value is exceeded, or the like) and data of a result of diagnosis performed using the diagnosing function or the like. In addition, similar to the process data, information of a tag name is also associated in the alarm event data.

In addition, for example, in a case in which a setting value that is set for controlling the operation of facilities or the like is changed using a control function in accordance with an operation of an operation device performed by an operator such as a worker performing operation control or maintenance of facilities in a plant, the field device outputs information representing a change in the setting value to the control system 14 as event data (hereinafter, referred to as "operation event data") of an event of an operation (hereinafter, referred to as an "operation event") for facilities. In addition, the operation event data also includes information representing a kind of a setting value (for example, a pressure value, a voltage value, a current value, or the like) changed (set) using the control function and data thereof.

Also in the alarm event data, similar to the process data and the alarm event data, information of a tag name is associated. The operation device operated by an operator, for example, may be an operation device arranged in each facility such as a control panel or a console, which is not illustrated in the drawing, having switches or volumes (variable resistors) arranged therein or an operation device such as a portable terminal, which is not illustrated in the drawing, held by an operator. The operation event data may be output by a field device according to an operation of an operation device to the control system 14 or be directly output by an operation device operated by an operator to the control system 14.

The control system 14 acquires process data, alarm event data, and operation event data output from a field device (which may be an operation device). In addition, the control system 14 acquires alarm event data and operation event data output from a field device (or an operation device) as event data. At this time, the control system 14 records the current time (date and time) at which each data is acquired. Then, the control system 14 outputs process data and event data to which information of time (date and time), in other words, information of time (date and time) at which the data is acquired, is assigned to the event analyzing device 10, for example, through a dedicated communication network built inside the plant.

In addition, the control system 14 may store process data and event data to which information of time (date and time) at which the data is acquired is assigned in a storage unit not illustrated in the drawing once, arrange data corresponding to a period (time) set in advance, and output the arranged data to the event analyzing device 10 as a history (log) corresponding the period set in advance. Furthermore, every time process data or event data is acquired from a field device (which may be an operation device), the control system 14 may sequentially output the process data or the event data to which information of time (date and time) at which the data is acquired is assigned to the event analyzing device 10.

The historian 15 is a data storage device that stores a history (log) of data corresponding to a long period by storing the same data as the process data or the event data acquired by the control system 14 in a time series. The historian 15, for example, includes various memories such as a read only memory (ROM), a random access memory (RAM), and a flash memory and a storage device such as a hard disk drive (HDD). In addition, when process data or event data is stored, the historian 15 also assigns information of time (date and time) at which the data is acquired. The historian 15 outputs a log of the stored process data (hereinafter, referred to as "process log data") and a log of the stored event data (hereinafter, referred to as "event log data") to the event analyzing device 10, for example, through a dedicated communication network built inside the plant.

In the configuration of the event analyzing system 1 illustrated in FIG. 1, a configuration in which one control system 14 and one historian 15 are included is illustrated. However, the number of control systems 14 and the number of historians 15 included in the event analyzing system 1 are not limited to the one shown in the configuration illustrated in FIG. 1. In other words, the event analyzing system 1 may be configured to include a plurality of control systems 14 or a plurality of historians 15.

In addition, in the configuration of the event analyzing system 1, a configuration in which the control system 14 and the historian 15 are included as different devices is illustrated. However, the configuration of the control system 14 and the historian 15 in the event analyzing system 1 is not limited to the configuration illustrated in FIG. 1. For example, the historian 15 may be a configuration included in the control system 14 as a function of storing the process data and the event data in the control system 14. In other words, the historian 15 may be a constituent element that is built in the control system 14 and builds a control system such as a distributed control system.

The event analyzing device 10 is a processing apparatus that analyzes cause-effect relationships among various events inside the plant on the basis of (by combining) the process data (process log data) and the event data (event log data) acquired from the control system 14 and the process log data and the event log data acquired from the historian 15. In description presented below, the event analyzing device 10 will be described as acquiring the process log data and the event log data from the control system 14 and the historian 15 and analyzing cause-effect relationship between data by combining process data included in the acquired process log data and event data included in the event log data.

The event analyzing device 10 performs a process (analysis process) of analyzing a cause-effect relationship integrating the process data and the event data. More specifically, the event analyzing device 10 analyzes a trend of process data during a long period set in advance to detect a section until a measured value (hereinafter, referred to as a "process value") represented in the process data becomes stable after deviating from a target process value (target value), in other words, a section in which the process value changes. Then, the event analyzing device 10 regards a state having time continuity in which the process value changes in a same pattern in each detected section as one event of a process (hereinafter, referred to as a "process change event") in the facility and generates process change event data representing information representing a state in which the process value changes in this process change event in a format similar to that of the alarm event data or the operation event data included in the event data. In other words, the event analyzing device 10 detects a place (section) in which the trend is changed from the trend of the process data as a process change event and generates process change event data, thereby converting the process data into event data. In addition, the event analyzing device 10 considers (applies) a time concept also for the alarm event data and the operation event data included in the event data. Then, the event analyzing device 10 analyzes cause-effect relationships between events, in other words, between process change events, between alarm events, and between operation events on the basis of the generated (converted) process change event data and alarm event data and operation event data included in the event data in which the time concept is considered (applied). The analysis of a cause-effect relationship in the event analyzing device 10 is performed by building a cause-effect model such as a Bayesian network representing a cause-effect relationship between events. In this Bayesian network, in addition to information of a cause-effect relationship between events, at least time continuity of events and a delay time between events are included as time concepts considered for each piece of event data. For this reason, the event analyzing device 10 can calculate a distribution of time differences between events and a distribution of continuation periods of the events while simultaneously performing an analysis of a cause-effect relationship between events such as estimation of a cause of the occurrence of an event of interest, prediction of the occurrence of a different event caused by an event of interest, and the like. In addition, the event analyzing device 10 can estimate occurrence probabilities, occurrence times, and continuation periods of the event of interest and other predicted events on the basis of a result of the analysis of the cause-effect relationships and information of the calculated distribution of time differences between events, a distribution of continuation periods of events, and the like. Then, the event analyzing device 10 displays results of the estimation and the prediction by outputting them to the display device 13, thereby presenting various kinds of information, for example, to a supervisor of a process operation in the plant or a user using the event analyzing device 10 such as an operator of the control system 14 to support an operation performed by the user.

The event analyzing device 10 includes an event data collector 101, an event data aggregator 102, a process data collector 103, a trend change detector 104, an event data converter 105, a cause-effect relationship analyzer 106, and an analysis result outputter 107. The cause-effect relationship analyzer 106 includes a relation analyzing module 1061, a cause-effect model building module 1062, and a causal analysis module 1063. In the configuration of the event analyzing device 10 illustrated in FIG. 1, a configuration which also includes an abnormality predicting module 1064 inside the cause-effect relationship analyzer 106 as an example of a constituent element for realizing an optional additional function in the event analyzing device 10 is illustrated. Details of the operation of the event analyzing device 10 and the function and the operation of each constituent element configuring the event analyzing device 10 will be described later.

The event database 11 is a database used when the event analyzing device 10 performs a cause-effect relationship analyzing process. In the event database 11, event data such as the alarm event data and the operation event data acquired by the event analyzing device 10 and the process change event data converted by the event analyzing device 10 is stored. For example, the event database 11 includes various memories such as a ROM, a RAM, and a flash memory and a storage device such as an HDD.

The cause-effect model database 12, similar to the event database 11, is a database used when the event analyzing device 10 performs the cause-effect relationship analyzing process. In the cause-effect model database 12, a cause-effect model such as the Bayesian network configured in the cause-effect relationship analyzing process performed by the event analyzing device 10 is stored. For example, similar to the event database 11, the cause-effect model database 12 includes various memories such as a ROM, a RAM, and a flash memory and a storage device such as an HDD.

In the configuration of the event analyzing system 1 illustrated in FIG. 1, a case in which the event database 11 and the cause-effect model database 12 are configured as different databases is illustrated. However, the configuration of the event database 11 and the cause-effect model database 12 included in the event analyzing system 1 is not limited to the configuration of different databases unlike that illustrated in FIG. 1. For example, a configuration may be employed in the event analyzing system 1 in which the event database 11 and the cause-effect model database 12 are configured as one database, and the storage capacity included in the one database is divided and used. In addition, each of the event database 11 and the cause-effect model database 12, for example, may be an external storage device such as a storage device on the Internet in a cloud computing system. Furthermore, each of the event database 11 and the cause-effect model database 12 may be configured to be included inside the event analyzing device 10 as constituent elements of the event analyzing device 10.

The display device 13 is a display terminal device used for presenting various kinds of information to a user using the event analyzing device 10 by generating and displaying a display screen corresponding to information output from the event analyzing device 10. More specifically, the display device 13 generates a display screen corresponding to a result of analyses of cause-effect relationships, information of the distribution of time differences, information of the distribution of continuation periods, and the like output by the event analyzing device 10 and presents the generated display screen to a user. The display device 13, for example, includes a display device such as a liquid crystal display (LCD). In addition, the display device 13 may have a function of an operation device, which is not illustrated in the drawing, configured by a press sensor and the like for inputting an instruction by being operated by the user when the event analyzing device 10 performs the cause-effect relationship analyzing process. In other words, the display device 13 may be configured as a touch panel combined with the operation device.

According to such a configuration, the event analyzing system 1 converts the process data of various processes performed by facilities arranged inside the plant into event data (process change event data). Then, the event analyzing system 1 integrates event data acquired by converting the process data and event data (the alarm event data and the operation event data) of facilities, which is also used by a conventional event analyzing device, in other words, combines the processes and events in the facilities and analyzes cause-effect relationships between various events inside the plant.

Next, more details of the configuration and the operation of the event analyzing device 10 will be described. First, the function and the operation of each constituent element configuring the event analyzing device 10 will be described. As described above, the event analyzing device 10 includes the event data collector 101, the event data aggregator 102, the process data collector 103, the trend change detector 104, the event data converter 105, the cause-effect relationship analyzer 106, and the analysis result outputter 107.

The event data collector 101 acquires event log data from the control system 14 and the historian 15. More specifically, when the event analyzing device 10 starts the cause-effect relationship analyzing process, or regularly at a time interval set in advance, the event data collector 101 requests the control system 14 and the historian 15 to output event log data and acquires event log data output from the control system 14 and the historian 15 in response to the request.

In the event log data, a plurality of pieces of event data (the alarm event data and the operation event data) for each event are included with a single event (an alarm event or an operation event) occurring instantly in the plant regarded as one event. Information representing the occurrence time of an event, and the kind of event is assigned to each piece of event data included in the event log data. The information of the occurrence time that is assigned to each piece of event data is information of time (date and time) assigned by the control system 14 or the historian 15 when the event data is acquired. In addition, in the information representing the kind of event that is assigned to each piece of event data, information of an identification name (a tag name used for identifying a field device in which the event has occurred), parameters (information of a kind of alarm, a kind of setting (operation), and the like, data of a diagnosis result and a setting value, and the like), a type ("Alarm" representing an alarm event or "Operation" representing an operation event), and the like is included.

The event data collector 101 outputs the acquired event log data to the event data aggregator 102. In a case in which event data (event data of each time) sequentially output from the control system 14 is acquired, the event data collector 101 sequentially outputs each piece of event data to the event data aggregator 102.

The event data aggregator 102 performs aggregation by performing a predetermined aggregation process for a plurality of pieces of event data included in the event log data output from the event data aggregator 102. The aggregation process performed by the event data aggregator 102 is a process of converting (aggregating) a single event of a same kind into one event having a continuation period in time. More specifically, in the aggregation process, the event data aggregator 102 arranges event data of a same kind (event data of a single event) to be arranged as one piece of event data into one piece of event data having a continuation period in time on the basis of the information of the kind of event that is assigned to the event data. For example, in the aggregation process, the event data aggregator 102 determines event data to which information of the same identification name, the same parameters, and the same type is assigned as information representing the type of event, in other words, event data of the same event of the same field device as event data of the same kind and arranges the event data described above as one piece of event data.

More specifically, in a plant, there are cases in which an alarm event of the same kind is issued again within an assumed short period (for example, within 10 minutes) due to a change in a measured value measured by a field device before and after a target value of a process in a facility. Then, there are also cases in which an alarm event of the same kind within the assumed short period repeatedly occurs. In such cases, a plurality of single alarm events of the same kind (an alarm event of one time) are included in the event log data at the interval of the assumed short time (date and time) (there are also cases of unequal intervals). Thus, the event data aggregator 102 sets an assumed short period in advance, handles a plurality of single alarm events of the same kind repeated within the short period set in advance as an alarm event group, and performs a process of arranging alarm event data corresponding to this alarm event group as one piece of alarm event data having the period in which the alarm events of the same kind have occurred as a continuation period.

In addition, in a plant, when an operator performs an operation of changing a setting value for a facility, there are also cases in which an operation event of the same kind (here, there are cases in which the setting value is different) repeatedly occurs within an assumed short period (for example, within five minutes) due to execution of a ramping operation for gradually changing a setting value over a plurality of number of times or the like. Also in such cases, in the event log data, a plurality of single operation events of the same kind (an operation event of one time) are included at the interval (there are also cases of unequal intervals) of the assumed short time (date and time). Thus, the event data aggregator 102 sets an assumed short period in advance, handles a plurality of single operation events of the same kind repeated within the short period set in advance as an operation event group performed by an operator having the same intention, and performs a process of arranging operation event data corresponding to this operation event group into one piece of operation event data having a period in which the operation events of the same kind have occurred (the same operation is performed) as a continuation period.

The event data aggregator 102 assigns information representing the continuation period of the event and information representing the kind of event to the event data (hereinafter, also referred to as "continued event data") after the execution of the aggregation process. The information of the continuation period assigned to each continued event data is information of start time and end time of the continuation period of the event. The start time of the continuation period of an event is information of occurrence time assigned to the event data of an event that has occurred first in the event group arranged as one, in other words, information of time (date and time) assigned when the control system 14 or the historian 15 acquires event data included in the event group first time. The end time of the continuation period of an event is information of occurrence time assigned to the event data of an event that has occurred last in the event group arranged as one, in other words, information of time (date and time) assigned when the control system 14 or the historian 15 acquires event data included in the event group last time. In addition, the event data aggregator 102, for event data that is not arranged by the aggregation process, in other words, event data of a signal event (an event of one time) that becomes event data of one event alone, assigns information of occurrence time assigned to the event data, in other words, information of the same time (date and time) to both the start time and the end time of the continuation period. In addition, the information representing the kind of event assigned to each continued event data is information representing the kind of event assigned to one piece of event data (for example, event data of an event that has occurred first) included in the event group arranged as one.

The event data aggregator 102 outputs event log data configured to include the continued event data after the execution of the aggregation process and the event data of a single event to the event database 11 so as to be stored (saved) therein. In description presented below, continued event data after execution of the aggregation process and event data of a single event will not be discriminated from each other and will be referred to as "continued event data".

In the configuration of the event analyzing device 10 configuring the event analyzing system 1 illustrated in FIG. 1, a case in which the event data collector 101 and the event data aggregator 102 are configured as different constituent elements is illustrated. However, the configuration of the event data collector 101 and the event data aggregator 102 included in the event analyzing device 10 is not limited to a configuration in which the units are included as different constituent elements as illustrated in FIG. 1. For example, in the event analyzing device 10, a configuration in which the function of the event data aggregator 102 is included in the event data collector 101, in other words, a configuration in which the function of the event data collector 101 and the function of the event data aggregator 102 are combined may be configured as the event data collector 101.

The process data collector 103 acquires process log data from the control system 14 and the historian 15. More specifically, when the event analyzing device 10 starts the cause-effect relationship analyzing process, or regularly at a time interval set in advance, the process data collector 103 requests the control system 14 and the historian 15 to output process log data and acquires process log data output from the control system 14 and the historian 15 in response to the request. In the process log data, a plurality of pieces of process data measured at each interval of a time (for example, "minute" or "second") set in advance are consecutively included.

The process data collector 103 outputs the acquired process log data to the trend change detector 104. In a case in which process data (process data for each measurement of one time performed by a field device) sequentially output from the control system 14 is acquired, the process data collector 103 sequentially outputs each process data to the trend change detector 104.

The trend change detector 104 detects a change (variation) in the trend of process data during a long period set in advance on the basis of a plurality of pieces of process data included in the process log data output from the process data collector 103. More specifically, the trend change detector 104 determines whether or not a process value deviates from a target value by analyzing (checking) the process value represented in each process data consecutively included in the process log data at the interval of a time set in advance. At this time, in a case in which a process value represented in the process data has been changed more than a change amount of the process value set in advance, the trend change detector 104 may determine that the process value has been changed. In this way, in a case in which the process value is determined to have been changed less than the change amount of the process value set in advance, the trend change detector 104 can determine that the process value has not been changed, in other words, ignore a slight change (variation) of the process value. Then, the trend change detector 104 sets a result of the determination of the change in the process value as a change in the trend (trend change) of each process data.

In addition, the trend change detector 104 determines a section from a time point at which the process value starts to deviate from the target value until now to a time point at which the process value converges at the target value until now again or a new target value as a section (variation section) in which the trend of the process data varies on the basis of the detected change in the trend of the process data, in other words, the determined change in each process value. Then, the trend change detector 104 classifies each determined variation section into one section of three kinds (definitions) of "unstable section (Unstable)", "target value increase section (Increase)", and "target value decrease section (Decrease)" defined in advance for representing the kinds of variation of the process value. Here, "unstable section" is, in the operation period of a facility operating with a target value being fixed, a section representing that the process value deviates from the range of the target value until now and then is returned to the same range of the target value again and, for example, represents a section in which the process value is not stable (unstable) from a fixed target value until now. In addition, "target value increase section" is a section representing that the process value deviates from the range of a target value until now and converges to be close to the range of a new target value having a larger value and, for example, represents a section in which the process value is increased according to the setting of a new target value having a value larger than that until now in a facility and is in the middle of transition to the new target value.

Furthermore, "target value decrease section" is a section representing that the process value deviates from the range of a target value until now and converges to be close to the range of a new target value having a smaller value and, for example, represents a section in which the process value is decreased according to the setting of a new target value having a value smaller than that until now in a facility and is in the middle of transition to the new target value. Here, the classification of the variation section detected by the trend change detector 104 is not limited to the three kinds of "unstable section", "target value increase section", and "target value decrease section", and sections of different kinds may be defined as is necessary, in other words, different definitions representing the kinds of variations of the process value may be set.

The trend change detector 104 assigns information (information representing one of "unstable section", "target value increase section", and "target value decrease section") of the classified variation section to each process data included in the process log data as information of a detection result acquired by detecting a trend change in the process in the facility such that each classified variation section, in other words one variation section is one process variation event having time continuity (having a continuation period). In addition, the trend change detector 104 does not assign information representing a variation section (performs no process) for process data of which the process value is not determined to have been changed, in other words, process data not classified into a variation section. Here, the trend change detector 104 may assign information representing no classification into a variation section to process data of which the process value is determined not to have been changed as information of a result of detection of a trend change in the process.

The trend change detector 104 outputs the process log data configured to include the process data to which the information of the classified variation section (detection result) is assigned to the event data converter 105. In addition, in a case in which the process log data is output from the process data collector 103, the trend change detector 104, as described above, by detecting a trend change in the process data during a long period set in advance, assigns the information of the variation section acquired by classifying each process data as the information of a detection result of the process and outputs resultant process data to the event data converter 105. However, in a case in which the process data collector 103 acquires process data (process data for each measurement of one time performed by a field device) sequentially output from the control system 14 and sequentially outputs the process data to the trend change detector 104, the trend change detector 104 can sequentially determine whether or not the process value represented in the process data has been changed more than the change amount of the process value set in advance but may not immediately perform the classification into a variation section. For example, for the process data of which the process value is determined to have been greatly changed for the first time, it cannot be immediately determined whether the process data is classified into "unstable section", "target value increase section", or "target value decrease section". The reason for this is that the process data of which the process value is determined to have been greatly changed for the first time, first, may be considered to be classified into "target value increase section" or "target value decrease section", but, in a case in which a direction in which a process value represented in the next process data changes is in the opposite direction, it is necessary to classify the process data into "unstable section". The subsequent process data can be sequentially classified into one of "unstable section", "target value increase section", and "target value decrease section" on the basis of a direction in which the process value represented by the previous process data has been changed. For this reason, the trend change detector 104 may be configured to sequentially output process data acquired by assigning information of a classified variation section (detection result) to the process data sequentially output from the process data collector 103 to the event data converter 105 from a timing that is delayed by at least a time corresponding to one process data. At this time, the trend change detector 104 sequentially outputs each process data to which the information of a classified variation section (detection result) is assigned also to the cause-effect relationship analyzer 106.

The event data converter 105 converts processes represented in a plurality of pieces of process data included in the process log data into one process variation event on the basis of the information representing a detection result of the trend change assigned to each process data included in the process log data output from the trend change detector 104. In the process of converting processes represented in the process data into one process variation event using the event data converter 105, information used for a determination is different. In other words, although the information is the information representing a classified variation section, a processing method (the way of thinking) thereof is similar to that (the way of thinking) of the aggregation process performed by the event data aggregator 102. More specifically, the event data converter 105, first, extracts process data to which information representing a classified variation section is assigned from among a plurality of pieces of process data included in the process log data. Thereafter, the event data converter 105, for the plurality of pieces of the extracted process data, by using a method (the way of thinking) similar to that in the aggregation process performed by the event data aggregator 102, arranges processes represented by the plurality of pieces of process data, which are continuous in time (continuous in units of time set in advance), classified into the same variation section as one process data group. Then, the event data converter 105 performs conversion into one process variation event in which the information of the same variation section assigned to all the process data corresponding to the arranged process data group is set as an event in the process of the facility. In addition, each process variation event converted by the event data converter 105 has a variation section represented by time (date and time) assigned by the control system 14 or the historian 15 to each process data corresponding to the arranged process data group, in other words, a time from a time point at which the process value starts to deviate from a target value until now to a time point at which the process value converges at the target value until now again or a new target value as a continuation period in time.

The event data converter 105 generates process variation event data in which information representing the state of a variation in the process value varies in the converted process variation event is represented and assigned in the same format as that of the alarm event data or the operation event data included in the event data. More specifically, the event data converter 105 generates process variation event data to which information representing start time and end time of the continuation period (variation section) and information representing the kind of event are assigned as information representing the variation state of the process in the facility. The start time of the continuation period (variation section) assigned to the process variation event data generated by the event data converter 105 is information of time (date and time) assigned to process data of a time point at which the process value starts to deviated from a target value until now, in other words, information of time (date and time) assigned when the control system 14 or the historian 15 acquires the process data. In addition, the end time of the continuation period (variation section) assigned to the process variation event data generated by the event data converter 105 is information of time (date and time) assigned to process data of a time point at which the process value converges at the target value until now again or a new target value, in other words, information of time (date and time) assigned when the control system 14 or the historian 15 acquires the process data. Furthermore, in the information representing the kind of event assigned to the process variation event data generated by the event data converter 105, information of an identification name (tag name) of a device of which the process value is determined to have been changed, an identifier ("unstable section", "target value increase section", "target value decrease section", or the like) representing the kind of variation of the process value, a type ("Trend" representing a process variation event or, for example, "pressure", "temperature", or "flow rate" representing a varying process value) and the like are included.

The event data converter 105 outputs each generated process variation event data to the event database 11 to be stored (saved) therein. In addition, in a case in which continued event data has already been stored (saved) in the event database 11, the event data converter 105 integrates the process variation event data with the stored (saved) continued event data and stores (updates) resultant data. In the event analyzing device 10, the collection of the process data (process log data) and the event data (event log data) is asynchronously performed. Accordingly, in the event analyzing device 10, the storage (saving) of the continued event data in the event database 11 that is performed by the event data aggregator 102 and the storage (saving) of the process variation event data in the event database 11 that is performed by the event data converter 105 are asynchronously performed. For this reason, in a case in which the process variation event data has already been stored (saved) in the event database 11, the event data aggregator 102 integrates the continued event data with the stored (saved) process variation event data and stores (updates) resultant data. In description presented below, event data acquired by integrating the continued event data and the process variation event data will be referred to as "integrated event data".

In the configuration of the event analyzing device 10 configuring the event analyzing system 1 illustrated in FIG. 1, a case in which the trend change detector 104 and the event data converter 105 are configured as different constituent elements is illustrated. However, the configuration of the trend change detector 104 and the event data converter 105 included in the event analyzing device 10 is not limited to a configuration in which the units are included as different constituent elements as illustrated in FIG. 1. For example, in the event analyzing device 10, a configuration in which the function of the event data converter 105 is included in the trend change detector 104, in other words, a configuration combining the function of the trend change detector 104 and the function of the event data converter 105 may be configured to be included as the trend change detector 104.

In addition, in the configuration of the event analyzing device 10 configuring the event analyzing system 1 illustrated in FIG. 1, a case in which the event data aggregator 102 is configured to store (save) the continued event data in the event database 11, and the event data converter 105 is configured to store (save) the process variation event data in the event database 11 is illustrated. In other words, FIG. 1 illustrates the configuration of the event analyzing device 10 in which two constituent elements including the event data aggregator 102 and the event data converter 105 store (save or update) corresponding data in the event database 11. However, as described above, the process performed by the event data aggregator 102 for a plurality of pieces of event data included in the event log data, in other words, the aggregation process of generating continued event data and the process of converting the process data into a process variation event that is performed by the event data converter 105 are on the basis of methods (the ways of thinking) that are similar to each other. For this reason, in the event analyzing device 10, a constituent element (for example, an event storing unit) combining the function of the event data aggregator 102 and the function of the event data converter 105 may be included instead of the event data aggregator 102 and the event data converter 105, and this constituent element may be configured to manage integration (in other words, the generation of integrated event data) of the continued event data and the process variation event data represented in the same format and storage (saving or update) of the integrated event data in the event database 11.

The cause-effect relationship analyzer 106 acquires the integrated event data stored (saved) in the event database 11 and analyzes a cause-effect relationship for a combination of two or more events in considering (applying) a time concept on the basis of the process variation event data and the continued event data included in the acquired integrated event data. A combination of two or more events for which the cause-effect relationship is analyzed by the cause-effect relationship analyzer 106 may be a combination of the process variation event included in the process variation event data and any one of the alarm event and the operation event included in the continued event data. In other words, the cause-effect relationship analyzer 106 analyzes a cause-effect relationship between events acquired by combining processes and events in the facility regardless of a variation of the process in the facility or an event occurring in the facility. The reason for this is that, in the event analyzing device 10, by converting a variation of a process in the facility into an event (process variation event), the process variation event can be handled like events (an alarm event and an operation event) occurring in a facility for which a cause-effect relationship is analyzed by a conventional event analyzing device. Thus, the basic method (the way of thinking) in the analysis of a cause-effect relationship in the cause-effect relationship analyzer 106 is similar to a method (the way of thinking) of analyzing a cause-effect relationship in the conventional event analyzing device. In other words, the cause-effect relationship analyzer 106 can analyze a cause-effect relationship between events using a method that is similar to the method (the way of thinking) of analyzing a cause-effect relationship in the conventional event analyzing device.

In each piece of event data included in the integrated event data, event data having a continuation period in time is also included. For this reason, the cause-effect relationship analyzer 106 is configured to perform an analysis of a cause-effect relationship in consideration of (applying) a time concept. In description presented below, a method (the way of thinking) of analyzing a cause-effect relationship in consideration of (applying) a time concept different from a method (the way of thinking) of analyzing a cause-effect relationship in a conventional event analyzing device will be focused in the description. As described above, the cause-effect relationship analyzer 106 includes the relation analyzing module 1061, the cause-effect model building module 1062, and the causal analysis module 1063. As described above, the cause-effect relationship analyzer 106 is configured to include an abnormality predicting module 64 for realizing an optional additional function in the event analyzing device 10.

The relation analyzing module 1061 analyzes another field device having strong relation with a focused field device (control device) designated by a user and acquires event data of an event occurring with another field device having strong relation with the field device focused by the user among integrated event data stored (saved) in the event database 11 through a search. In addition, the relation analyzing module 1061 analyzes mutual relation between events on the basis of each acquired event data and narrows events (hereinafter, referred to as "related events") having strong relation.

More specifically, the relation analyzing module 1061 analyzes relation between the field device focused by the user and control devices such as the other field devices on the basis of configuration information of the plant such as a piping and instrumentation diagram (P&ID), a process flow diagram (PFD), a control loop, and definition information of a monitoring screen and narrows other field devices having strong relation to be specified. At this time, the relation analyzing module 1061 narrows tag names (hereinafter, referred to as "relating tags") assigned to the field device focused by the user and other field device having strong relation with this field device to be specified. Here, in the P&ID, configuration information of the inside of the plant such as piping arranged inside the plant and positions at which the field devices are installed is schematized. In addition, in the PFD, the flow of a process in a plant until the formation of a product from a raw material is schematized. In the control loop, relation of control performed in processes in a plant is schematized. In addition, the definition information of monitoring screen is configuration (definition) information of process data included in the monitoring screen displayed when a process including a branching condition is performed in a plant.

Thereafter, the relation analyzing module 1061 retrieves event data of all the events having possibilities of occurrence between the field device focused by the user and the specified field device from the integrated event data stored (saved) in the event database 11 and acquires all the retrieved event data. In addition, the relation analyzing module 1061 acquires all the event data in which a tag name specified as a relating tag is assigned as an identification name. In order to acquire each piece of event data, the relation analyzing module 1061 may arrange each kind of events (for example, the same tag name, the sane identifiers, and events of the same type are arranged) and acquire corresponding event data.

Then, the relation analyzing module 1061, first, calculates a period in which each event occurs, in other words, the continuation period of each event on the basis of start time and end time included in each piece of event data acquired from the event database 11. Then, the relation analyzing module 1061 aligns the calculated continuation periods in order of time for each kind of events (in other words, for each same event) to be represented on one time axis. Thereafter, the relation analyzing module 1061 calculates the degree of similarity (degree of relation) between each event and the event focused by the user on the basis of the number of times of overlapping between the continuation period of each event represented in order of time on the same time axis and the continuation period of an event occurring in the field device focused by the user. Then, the relation analyzing module 1061 retrieves events having degrees of similarity higher than a value set in advance and sets combinations (related event group) of the retrieved events having high degrees of similarity (relation) and the event focused by the user as related events.

The relation analyzing module 1061 outputs event data (hereinafter, referred to as "related event data") of the events narrowed down as related events among all the events, in which a tag name specified as the relating tag is assigned as a tag name, acquired from the event database 11 to the cause-effect model building module 1062.

While being event data of events of the same kind, the event data included in the related event data is considered to have a different combination of events for each unit (for example, each time period) determined as related events. For this reason, when related event data is output to the cause-effect model building module 1062, the relation analyzing module 1061 may output the related event data after assigning the time period determined when narrowing down the events into the related events, information used for identifying the related events, and the like to each piece of event data.

The cause-effect model building module 1062 builds (generates) a cause-effect model for analyzing a cause-effect relationship on the basis of the related event data output from the relation analyzing module 1061. In each piece of event data included in the related event data, as described above, information of a continuation period in time is included. Thus, in a cause-effect model building process performed by the cause-effect model building module 1062, first, similar to the relation analyzing module 1061, for each kind of event, continuation periods in which events occur are arranged to be aligned in order of time for each kind of event on the basis of the start time and the end time included in the related event data output from the relation analyzing module 1061. At this time, the cause-effect model building module 1062 divides the time axis into units of blocks each having a time width (reference time width) of a reference set in advance and arranges the continuation periods of events to be aligned for each kind of events such that the continuation periods of all the events are illustrated on this time axis. Then, the cause-effect model building module 1062 arranges a plurality of blocks in which the continuation periods of the events narrowed down as a same related event group are arranged as one "phenomenon". Thereafter, the cause-effect model building module 1062 generates virtual event data (hereinafter, referred to as "projected event data") projected into the first block of each phenomenon such that information of an event represented by a plurality of blocks configuring an arranged phenomenon, in other words, information of each event narrowed down as a same related event group is folded less. Here, in data (hereinafter, referred to as "projected data") corresponding to each phenomenon included in the projected event data, information of occurrence/no-occurrence of each event, a time difference between events, and the continuation periods of events, which is presented by a plurality of blocks configuring the phenomenon, is included. Then, finally, the cause-effect model building module 1062 builds a cause-effect model on the basis of the generated projected event data. Here, the cause-effect model building module 1062 builds a Bayesian network in which cause-effect relationships between events are represented as probabilities as a cause-effect model.

The Bayesian network is one of graphical models and is a model of probability reasoning in which reasoning of a complex cause-effect relationship between events is represented using a directed graph structure, and a relation between variables is represented as a conditional probability. Generally, the Bayesian network is a model for representing a cause-effect relationship between events that simultaneously occur and thus is difficult to use for an analysis of a cause-effect relationship including a time factor such as an occurrence time difference and a continuation period between events. However, the cause-effect model building module 1062, as described above, by arranging a combination of events narrowed down as a same relating event group as one "phenomenon", allows a time factor to be included in projected event data used when configuring the Bayesian network as one phenomenon, in other words, one event. In this way, the cause-effect model building module 1062 can build a Bayesian network including a time factor as a cause-effect model by using an algorithm similar to that of a conventional event analyzing device. Then, the causal analysis module 1063 to be described later, can represent another event causing a certain event or another event that may occur after the occurrence of a certain event using probabilities by using the Bayesian network. In addition, the causal analysis module 1063 to be described later can represent information of a distribution (a distribution of time differences when events occur or a distribution of continuation periods of occurring events) relating to time on the basis of the time factor included in the Bayesian network.

The cause-effect model building module 1062 outputs the built cause-effect model (Bayesian network) to the cause-effect model database 12 so as to be stored (saved) therein. In addition, after the cause-effect model is built for the first time, and the cause-effect model is output to the cause-effect model database 12 so as to be stored (saved) therein, the cause-effect model building module 1062 may be configured to build (generate) a cause-effect model again on the basis of new (latest) integrated event data and update the cause-effect model stored (saved) in the cause-effect model database 12 at a regular time interval set in advance.

In addition, when the cause-effect model built this time is output to the cause-effect model database 12 so as to be stored (saved) therein, the cause-effect model building module 1062 may update the cause-effect model that has been built and stored (saved) previously or may accumulate cause-effect models built until now by newly storing (saving) the cause-effect model built this time. The cause-effect model built until now that have been accumulated by the cause-effect model building module 1062, for example, may be used by the abnormality predicting module 1064 for realizing an optional additional function in the event analyzing device 10.

The causal analysis module 1063 analyzes a cause-effect relationship between an event occurring in a field device focused by the user and an event occurring in another field device on the basis of the cause-effect model (Bayesian network) stored (saved) in the cause-effect model database 12. For example, the causal analysis module 1063 estimates another event causing the occurrence of an event occurring in the field device focused by the user and predicts an event that may occur in the future. In addition, for example, the causal analysis module 1063 calculates a distribution of time differences (a difference between occurrence times) when an event estimated or predicted occurs and a distribution of continuation periods of occurring events and calculates (estimates) the occurrence probability and the continuation period of the estimated or predicted event. Then, the causal analysis module 1063 outputs an estimated cause of the occurrence of an event and the information (the occurrence probability, the occurrence time, the continuation period, and the like) of an event predicted to occur to the analysis result outputter 107 as a result of the analysis of the cause-effect relationship. The method of analyzing a cause-effect relationship in the causal analysis module 1063 is similar to the method of analyzing a cause-effect relationship performed using a Bayesian network in a conventional event analyzing device, and thus, detailed description thereof will not be presented here.

The analysis result outputter 107 generates display data used for visualizing the information of the result of the analysis of a cause-effect relationship output from the cause-effect relationship analyzer 106 and presenting the visualized information to the user. More specifically, the analysis result outputter 107 generates display data used for presenting an estimation result of a cause of the occurrence of an event that has occurred in the focused field device designated by the user and information of the occurrence probability, the occurrence time, the continuation period, and the like of an event predicted to occur in the future, which are output from the cause-effect relationship analyzer 106 as a result of the analysis of a cause-effect relationship, to the user. In addition, the analysis result outputter 107 may generate display data in which the cause-effect model (Bayesian network) built by the cause-effect relationship analyzer 106 is represented as a graph. The analysis result outputter 107 outputs the generated display data to the display device 13, thereby causing the display device to display the display screen corresponding to the display data.

In addition, the analysis result outputter 107 may have a user interface function for outputting information input from an operation device, which is not illustrated in the drawing, operated by the user for designating a field device to be focused or requesting the execution of the process of analyzing a cause-effect relationship to the cause-effect relationship analyzer 106. In a case in which the function of an operation device that is not illustrated in the drawing is included in the display device 13, the analysis result outputter 107 outputs information input from the operation device that is not illustrate in the drawing to the cause-effect relationship analyzer 106.

The configuration described until now is a basic configuration for realizing basic functions of the event analyzing device 10. According to such a configuration, the event analyzing device 10 converts the process log data acquired from the control system 14 and the historian 15 into event data (process variation event data) and integrates the event data (the alarm event data and the operation event data) acquired from the control system 14 and the historian 15. At this time, the event analyzing device 10 performs the integration including each piece of event data (the alarm event data and the operation event data integrated as the continued event data and the process variation event data) having a continuation period in time. Then, the event analyzing device 10, after narrowing down related events relating to an event of the focused field device designated by the user, arranges a combination of events having a continuation period in time as a phenomenon and allows each phenomenon to be handled as one event, thereby allowing an analysis of a cause-effect relationship to be performed similar to a conventional event analyzing device. In this way, the event analyzing device 10, similarly, handles the process data of various processes performed by each facility arranged inside the plant as event data and combines cause-effect relationships between events, in other words, processes and events in the facility, whereby a cause-effect relationship between events can be analyzed.

As described above, in the configuration of the event analyzing device 10 illustrated in FIG. 1, as an example of a constituent element used for realizing an optional additional function performed by the event analyzing device 10, the abnormality predicting module 1064 that can be selectively included in the configuration realizing the basic functions of the event analyzing device 10 is illustrated to be configured to be included inside the cause-effect relationship analyzer 106.

The abnormality predicting module 1064 predicts a change (a variation or an abnormality) in the trend of the process data by monitoring the process data of a process that is currently performed in each facility arranged inside the plant that is sequentially output from the trend change detector 104. More specifically, the abnormality predicting module 1064 determines a change (variation) in the trend of the process data by sequentially checking (monitoring) information of a classified variation section (detection result) assigned to the process data (the current process data measured by the field device) that is sequentially output from the trend change detector 104 and predicts whether or not there is a possibility that the current process changes (varies) more greatly or has an abnormality in the future in real time.

In the process of predicting a change (a variation or an abnormality) in the trend of the process data, the abnormality predicting module 1064 checks (monitors) whether or not information of the classified variation section (detection result) assigned to the process data represents a change larger than the change amount of the process value set in advance, in other words, represents the process value deviating from the target value until now. Then, in a case in which it is checked that the process value starts to deviate from the target value until now based on the information of the classified variation section (detection result) assigned to the checked (monitored) process data, the abnormality predicting module 1064, first, checks (specifies) a tag name assigned to the process data. Subsequently, the abnormality predicting module 1064 retrieves a cause-effect model built on the basis of related event data in which process data (process variation event data) having the specified tag name is narrowed down as relating events from among cause-effect models (a plurality of cause-effect models stored (saved) previously) stored in the cause-effect model database 12. Then, the abnormality predicting module 1064 performs a prediction process of predicting another change (a variation or an abnormality) relating to the event in which a change in the process data is checked on the basis of the retrieved cause-effect model. In this prediction process, the abnormality predicting module 1064 retrieves another event (an alarm event, an operation event, and a process variation event) having a cause-effect relationship with the event in which a change in the process data has been checked on the basis of the retrieved cause-effect model. Then, the abnormality predicting module 1064, on the basis of the result of the retrieval, predicts an alarm event and another process variation event occurring in the future due to the change in the process data and the occurrence probabilities of such events and retrieves an operator's operation (operation event) performed in a case in which such events occur, and the like. Then, the abnormality predicting module 1064 outputs information representing the result of the prediction process to the analysis result outputter 107. In this way, the analysis result outputter 107 generates display data used for visualizing the information of the result of the prediction process output from the abnormality predicting module 1064 and outputs the generated display data to the display device 13 to cause the display device 13 to display a display screen corresponding to the display data, thereby presenting the information representing the result of the prediction process performed by the abnormality predicting module 1064 to the user.

In addition, the prediction process performed by the abnormality predicting module 1064 on the basis of the retrieved cause-effect model may be performed on the basis of the same way of thinking as that of the process of analyzing a cause-effect relationship performed by the causal analysis module 1063. For this reason, the abnormality predicting module 1064 may perform the process up to the process of retrieving a cause-effect model in which the process data (process variation event data) in which a change in the process value has been checked is included from cause-effect models accumulated in the cause-effect model database 12, and the prediction process (retrieval of another event having a cause-effect relationship, prediction of the occurrence probability of such an event, and the like) performed thereafter may be performed by the causal analysis module 1063. In addition, the abnormality predicting module 1064 may cause the cause-effect model building module 1062 to additionally update the cause-effect model in which the information of the process data (process variation event data) in which a change in the process value has been checked is retrieved.

In this way, the abnormality predicting module 1064 can predict whether or not there is a possibility that the trend of the process data further changes (varies) or a possibility that the current process has an abnormality in the future in real time by real-time monitoring of process data of a process that is currently performed in each facility arranged inside the plant.

According to such a configuration, the event analyzing device 10 analyzes a cause-effect relationship between events by combining processes and events in a facility by integrating the event data (alarm event data and operation event data) in each facility arranged inside the plant and event data (process variation event data) acquired by converting the process data of a process performed by each facility. In this way, the event analyzing device 10 can support the user to manage the operations of the facilities by presenting various kinds of information to the user using the event analyzing device 10.

In the event analyzing system 1, the event analyzing device 10, for example, may be configured inside a personal computer (PC) used by the user using the event analyzing device 10 or a server apparatus. In such a case, the functions of the event analyzing device 10, in other words, the function of analyzing a cause-effect relationship in the event analyzing device 10 described above and the function of each constituent element configuring the event analyzing device 10 may be realized by executing software of an event analyzing program in the personal computer or the server apparatus.

Figure 2:
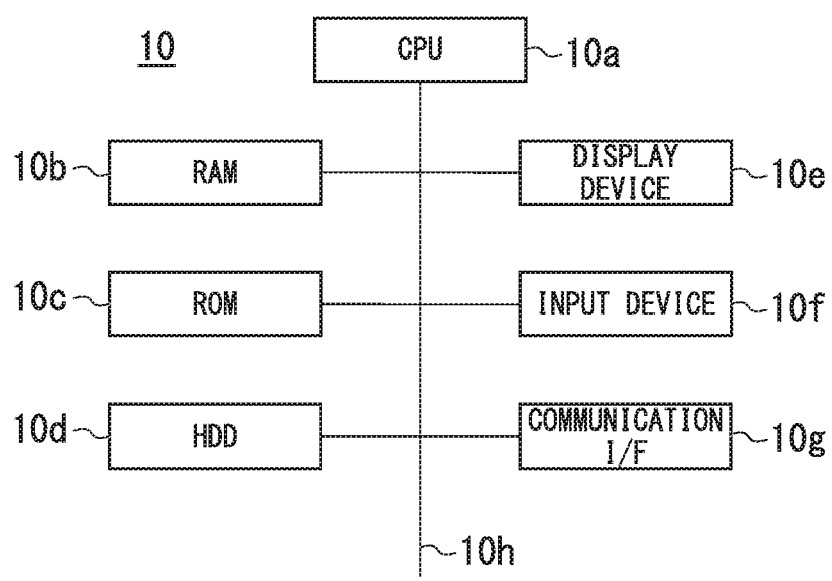
FIG. 2 is a block diagram illustrating one example of the hardware configuration of an event analyzing device according to an embodiment of the present invention.

Here, the hardware configuration of a case in which the event analyzing device 10 is configured inside a personal computer will be described. FIG. 2 is a block diagram illustrating one example of the hardware configuration of the event analyzing device 10 according to an embodiment of the present invention. As illustrated in FIG. 2, the event analyzing device 10 includes a central processing unit (CPU) 10a, a RAM 10b, a ROM 10c, an HDD 10d, a display device 10e, an input device 10f, and a communication interface (I/F) 10g. The constituent elements configuring the event analyzing device 10 are connected to a common bus 10h. Each constituent element configuring the event analyzing device 10 may be configured as a single device, or each constituent element may be configured as a system in which a plurality of devices are combined. In addition, each constituent element configuring the event analyzing device 10 may have a configuration that is shared by other devices or other hardware.

The CPU 10a is a processing device executing an event analyzing program used for realizing the function of an analysis process of a cause-effect relationship in the event analyzing device 10. Each of the RAM 10b, the ROM 10c, and the HDD 10d is a storage device that stores various programs such as an event analyzing program executed by the CPU 10a and the like, data generated in the middle of a process executed by the CPU 10a, a result of the process, or the like. The event analyzing program, for example, is provided using a storage medium on which the event analyzing program is recorded, a server providing an information processing program through a network, and the like and, for example, is installed in the HDD 10d. In order for the CPU 10a to execute the event analyzing program, the event analyzing program installed in the HDD 10d is, for example, transmitted to the RAM 10b such as a dynamic random access memory (DRAM) and is executed while the CPU 10a and the RAM 10b communicate with each other through a bus 10h.

The display device 10e, for example, is configured to include a display device such as a liquid crystal display and is a display device that displays a display screen of information to be provided for a user. In addition, the display device 10 may be the display device 13 configuring the event analyzing system 1. The input device 10f, for example, includes an input device operated by a user such as a keyboard, a pointing device such as a mouse, and the like. In addition, the input device 10f may be an operation device, which is not illustrated in the drawing, included in the display device 13 configuring the event analyzing system 1.

The communication interface 10g is a communication unit that performs communication through wired communication or radio communication between constituent elements such as the control system 14, the historian 15, the event database 11, the cause-effect model database 12, and the like configuring the event analyzing system 1 and performs data transmission and data reception. As the wired communication used in the communication interface 10g, communication compliant with a wired communication standard such as a local area network (LAN), a wired interface standard such as a universal serial bus (USB; registered trademark), or the like may be considered. In addition, as the radio communication used in the communication interface 10g, communication compliant with a radio communication standard such as wireless LAN communication (so-called Wi-Fi (registered trademark)), a short-distance radio communication standard such as Bluetooth (registered trademark), or the like may be considered. In addition, as communication used in the communication interface 10g performed in a plant, for example, communication according to various communication standard or various systems including an industrial radio communication such as ISA100.11 a, a radio standard such as a sensor network system, a communication standard such as wireless/wires HART (registered trademark) in which radio communication and wired communication are mixed, a communication standard of a master/slave system such as MODBUS (registered trademark), a field bus standard such as FOUN- DATION (registered trademark) field bus, a process field bus (PROFIBUS; registered trademark), and the like may be considered.

According to such a configuration, in the event analyzing device 10, the function of the analysis process of a cause-effect relationship is realized by software of the event analyzing program executed by a hardware configuration configured inside a personal computer.

Figure 3:
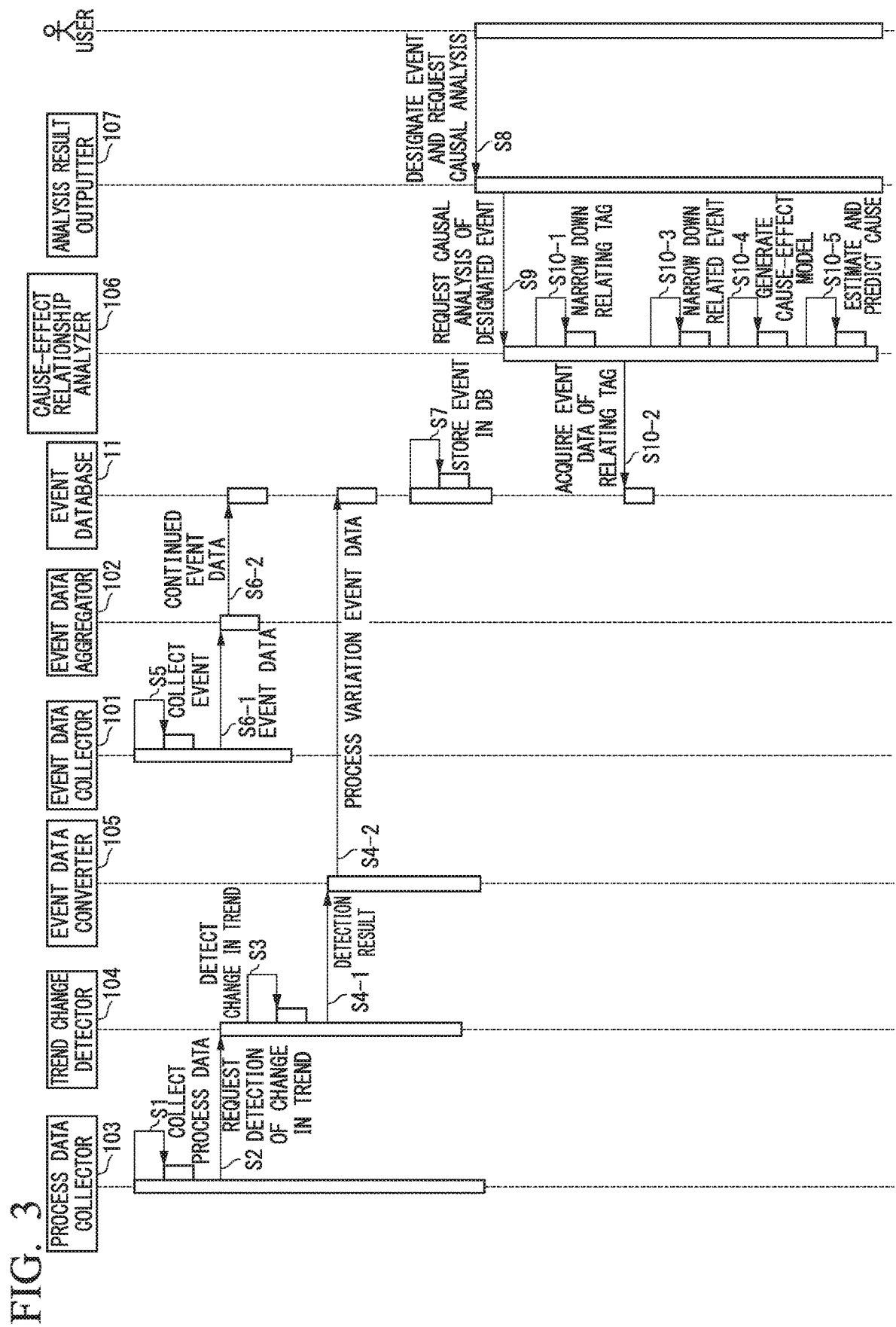
FIG. 3 is a sequence diagram illustrating the flow of a process performed at the time of analyzing a cause-effect relationship in an event analyzing device according to an embodiment of the present invention.

Next, the flow of the process when the event analyzing device 10 performs the analysis process of a cause-effect relationship will be described. FIG. 3 is a sequence diagram illustrating the flow of the process (the processing sequence) performed at the time of analyzing a cause-effect relationship in the event analyzing device 10 according to an embodiment of the present invention. FIG. 3 illustrates an example of the flow of the process of each of the event analyzing device 10 (the event data collector 101, the event data aggregator 102, the process data collector 103, the trend change detector 104, the event data converter 105, the cause-effect relationship analyzer 106, and the analysis result outputter 107) operated when an analysis process of a cause-effect relationship relating to events of a field device focused by a user is performed and the event database 11 used by the event analyzing device 10. In addition, in FIG. 3, an operation (an operation for the analysis result outputter 107) of a user, who designates a field device to be focused and requests the execution of an analysis process of a cause-effect relationship, using the event analyzing device 10 is illustrated as well.

In description present below, event log data and the process log data are assumed to be stored in the control system 14 in advance. In addition, in the event analyzing device 10, each of the event data aggregator 102 and event data converter 105 asynchronously stores (saves) integrated event data acquired by integrating corresponding event data in the event database 11. However, in description presented below, the event database 11 is assumed to integrate event data output from the event data aggregator 102 and the event data converter 105 and store (save) integrated data. In addition, the event analyzing device 10 is assumed to perform an analysis process of a cause-effect relationship (hereinafter, referred to as "causal analysis") on the basis of the event log data and the process log data stored in the control system 14.

The process data collector 103 regularly acquires (collects) process log data from the control system 14 (Step S1). When the collection of process log data corresponding to a fixed period has been completed, the process data collector 103 outputs the collected process log data corresponding to the fixed period to the trend change detector 104. In addition, the process data collector 103 requests to detect a change in the trend of the output process log data (Step S2).

The trend change detector 104 detects a change in the trend of the process data on the basis of a plurality of pieces of process data included in the process log data output from the process data collector 103 in response to a request from the process data collector 103 (Step S3). In Step S3, the trend change detector 104, as described above, determines a variation section of the process value represented in the process data and assigns information of a variation section classified as the information of a detection result of a change of the trend to each process data. Then, the trend change detector 104 outputs process log data configured to include the process data to which the information of the detection result is assigned to the event data converter 105 (Step S4-1).

The event data converter 105 converts a process represented in a plurality of pieces of process data included in the process log data into a process variation event having time continuity on the basis of the information of the detection result of the change of the trend assigned to each process data included in the process log data output from the trend change detector 104. Then, the event data converter 105 generates process variation event data by assigning information (information representing the variation state of the process value) on the basis of the information of the detection result of the trend change and outputs each generated process variation event data to the event database 11 so as to be stored (saved) therein as integrated event data (Step S4-2).

Here, an example of the process for the process log data acquired from the control system 14, in other words, the process (Steps S1 to S4-2) of generating process variation event data on the basis of the process log data will be described. FIGS. 4A and 4B are diagrams illustrating one example of a process (Step S3) of detecting a change in the trend of process data and a process (Steps S4-1 to S4-2) of generating a process variation event data in the event analyzing device 10 according to an embodiment of the present invention. In FIG. 4A, an example of the trend change of the process value is illustrated in the direction of a time axis by using a graph having the magnitude of the process value (PV value) represented in the process data acquired (collected) from the control system 14 by the process data collector 103 in Step S1 set as its vertical axis and the time set as its horizontal axis. The process value (PV value) in the example illustrated in FIG. 4A is a measured value measured in a facility in which a field device of which the tag name="TAG1" is installed. FIG. 4B illustrates one example of the process variation event data generated by the event data converter 105 in Step S4-2 in the form of a two-dimensional table. In FIG. 4B, each process variation event data representing a trend change in the process value of one example illustrated in FIG. 4A is illustrated to be aligned in each row. In addition, in FIG. 4B, information assigned to each process variation event data is illustrated to be aligned in each column. In FIG. 4B, while an example of the process variation event data is illustrated in the form of a two-dimensional table, the form of the process variation event data is not limited to the form of a table, and any form may be used as long as the same information is included in the form.

The trend change detector 104 detects a tend change of the process value represented in the plurality of pieces of process data included in the process log data output from the process data collector 103 in Step S3. Then, the trend change detector 104 classifies each variation section in which the trend change in the process value is detected in S4-1 into one section of three kinds of "unstable section", "target value increase section", and "target value decrease section". The trend change detector 104 performs the process of detecting a tend change (Step S3) and classifying a variation section (Step S4-1) in the following sequence.

(Sequence 1): The trend change detector 104, first, acquires a trend of the target value (Set Variable: SV value) set in a field device having the tag name="TAG1". The trend of the target value (SV value) set in the field device, for example, is acquired by performing a process using a low pass filter, a regression model, or the like for the process value (PV value) represented in the process data during a long period set in advance and acquiring an approximated line representing the trend of the process value (PV value) as a whole. In addition, in a case in which data (hereinafter, referred to as "trend data") in which target values (SV values) set in the field device installed in each facility arranged inside the plant are continuous is acquired from the control system 14, the trend change detector 104 may use the trend data of the acquired target values (SV values) without performing the process of acquiring the trend of the target value (SV value).

(Sequence 2): The trend change detector 104 compares the trend data of the continuous target values (SV values) with a process value (PV value) represented in each process data and detects a position (time point) at which the process value (PV value) greatly changes (changes more than the change amount of the process value set in advance) from the target value (SV value). In the graph of the trend change of the process value illustrated in FIG. 4A, a case is illustrated in which a position (time point) of 10:00:00 on Jan. 1, 2016 is detected as a position (time point) at which the process value (PV value) greatly changes to be in an unstable state, and a position (time point) of 10:12:00 on Jan. 1, 2016 is detected as a position (time point) at which the process value (PV value) greatly changes to be in a stable state. In addition, in the graph of the trend change of the process value illustrated in FIG. 4A, a case is illustrated in which a position (time point) of 12:10:00 on Feb. 3, 2016 is detected as a position (time point) at which the process value (PV value) greatly changes to be in an unstable state, and a position (time point) of 12:30:00 on Feb. 3, 2016 is detected as a position (time point) at which the process value (PV value) greatly changes to be in a stable state.

(Sequence 3): The trend change detector 104 classifies each section into one section representing a variation state of the process value (PV value) on the basis of the variation state of the process value (PV value) in a section (variation section) from the position (time point), at which the process value (PV value) greatly changes to be in the unstable state, detected in Sequence 2 to a position (time point) at which the process value greatly changes to be in the stable state. In Sequence 3, first, each variation section is temporarily assumed to be a section in which the target value (SV value) is constant. Here, the trend change detector 104, for example, assumes the target value (SV value) of the first position (time point) of the variation section to be a constant target value (SV value) (hereinafter, referred to as a "provisional target value"). Then, the trend change detector 104 acquires a difference from the provisional target value for the process value (PV value) of each position (time point) within this section. Then, the trend change detector 104 classifies each variation section based on whether variation section is in a direction in which an acquired difference value between the process value (PV value) of each position (time point) and the provisional target value increases or a direction in which the difference value decreases. More specifically, the trend change detector 104 classifies a variation section that is only in the direction in which the difference value increases (for example, "process value"– "provisional target value"=positive value) into "target value increase section (Increase)" and classifies a variation section that is only in the direction in which the difference value decreases (for example, "process value"–"provisional target value"=negative value) into "target value decrease section (Decrease)". In addition, the trend change detector 104 classifies a variation section including both the direction in which the difference value increases and the direction in which the difference value decreases into "unstable section (Unstable)". In the graph of the trend change of the process value illustrated in FIG. 4A, a case is illustrated in which a variation section of 10:00:00 on Jan. 1, 2016 to 10:12:00 on Jan. 1, 2016 is a variation section including both the direction in which the difference value increases and the direction in which the difference value decreases and is classified into "unstable section (Unstable)". In the graph of the trend change of the process value illustrated in FIG. 4A, a case is illustrated in which a variation section of 12:10:00 on Feb. 3, 2016 to 12:30:00 on Feb. 3, 2016 is a variation section is only in the direction in which the difference value increases and thus is classified into "target value increase section (Increase)".

The trend change detector 104 outputs process log data configured to include the process data to which the information of the variation section classified in Sequence 3 is assigned to the event data converter 105. Thereafter, the event data converter 105, in Step S4-2, generates process variation event data to which information on the basis of a result of detection of the trend change of the process value is assigned.

In FIG. 4B, information of each of "start time", "end time", "tag name", "identifier", and "type" is illustrated as information assigned when the event data converter 105 generates process variation event data. Here, "start time" and "end time" are information representing a variation section detected by the trend change detector 104. According to this "start time" and "end time", the process variation event data is represented to be an event having time continuity (having a continuation period). In addition, "tag name" is information representing an identification name of a field device that has output the process value for which the trend change detector 104 has detected a trend change. By using this "tag name", a process in which the process value has been changed, in other words, a facility arranged inside the plant is represented. In addition, "identifier" is information representing a classified variation section. By using this "identifier", a change in the process value, in other words, a change state of the process of the facility is represented. In addition, "type" is information representing a process variation event. By using this "type", even in a case in which the process variation event data is integrated into the integrated event data later, the event can be determined to be the process variation event. Here, information other than the information of "type" is information also assigned to the process log data output by the trend change detector 104. The information of "type" is process variation event data generated on the basis of the process log data output from the trend change detector 104. Thus, the information of "type" may be generated and assigned by the event data converter 105 or may be assigned by the trend change detector 104 to the process data as information of a detection result and output to the event data converter 105.

The process variation event data illustrated in each row in FIG. 4B illustrates each variation section illustrated in FIG. 4A. More specifically, in the first process variation event data illustrated in FIG. 4A, information of "start time"="2016/01/01 10:00:00", "end time"="2016/01/01 10:12:00", "tag name"="TAG1", "identifier"=Unstable", and "type"="Trend" are assigned. In this way, the first process variation event data represents that an unstable trend change occurs in the process value (PV value) of a facility in which a field device of tag name="TAG1" is installed between 10:00:00 on Jan. 1, 2016 and 10:12:00 on Jan. 1, 2016. In addition, in the second process variation event data illustrated in FIG. 4B, information of "start time"="2016/02/03 12:10:00", "end time"="2016/02/03 12:30:00", "tag name"="TAG1", "identifier"=Increase", and "type"="Trend" are assigned. In this way, the second process variation event data represents the occurrence of a trend change in which the process value (PV value) of a facility in which a field device of tag name="TAG1" is installed increases between 12:10:00 on Feb. 3, 2016 and 12:30:00 on Feb. 3, 2016.

In this way, the process data collector 103, the trend change detector 104, and the event data converter 105 respectively operate and convert a plurality of pieces of process data included in the process log data acquired from the control system 14 into a process variation event having a time continuity represented by "start time" to "end time". In addition, each of the process data collector 103, the trend change detector 104, and the event data converter 105 repeatedly performs the processes of Steps S1 to S4-2 described above regularly.

Referring back to FIG. 3, the description of the processing sequence of performing a causal analysis using the event analyzing device 10 will be continued.

The event data collector 101 regularly acquires (collects) event log data from the control system 14 (Step S5). When the collection of the event log data corresponding to a fixed period is completed, the event data collector 101 outputs the collected event log data corresponding to the fixed period to the event data aggregator 102 (Step S6-1).

The event data aggregator 102 performs an aggregation process of the plurality of pieces of event data included in the event log data output from the event data collector 101. Then, the event data aggregator 102 outputs the continued event data after the execution of the aggregation process to the event database 11 and stores (saves) the continued event data as integrated event data (Step S6-2).

Here, one example of the aggregation process (Steps S5 to S6-2) for the event log data acquired from the control system 14 will be described. FIGS. 5A and 5B are diagrams illustrating one example of the process (Steps S5 to S6-2) of generating continued event data by aggregating event data collected by the event analyzing device 10 according an embodiment of the present invention. In FIG. 5A, one example of event log data acquired (collected) from the control system 14 by the event data aggregator 102 in Step S5 is illustrated in the form of a two-dimensional table. In FIG. 5A, event data included in the event log data is aligned in each row. In addition, in FIG. 5A, information assigned to each piece of event data is illustrated to be aligned in each row. In FIG. 5B, one example of the continued event data after the aggregation process performed by the event data aggregator 102 in Step S6-2 is illustrated in the form of a two-dimensional table. In FIG. 5B, each continued event data is illustrated to be aligned in each row. In addition, in FIG. 5B, information assigned to each continued event data is illustrated to be aligned in each column. In FIGS. 5A and 5B, while examples of the event log data and the continued event data are illustrated in the forms of two-dimensional tables, the forms of the event log data and the continued event data are not limited to the forms of tables, and any form may be used as long as the same information is included in the form.

In FIG. 5A, event data to which information of each of "date and time", "tag name", "identifier" and "type" is assigned is illustrated. Here, "date and time" is information representing time (date and time) assigned when the control system 14 acquires event data. By using this "date and time", the occurrence time of an event represented in the event data is represented. In addition, "tag name" is information representing the identification name of a field device in which an event has occurred. By using this "tag name" a field device in which the event has occurred, in other words, a facility arranged inside the plant is represented. In addition, the "identifier" is information representing the kind and the content (the kind of alarm and the kind of a setting (operation), a diagnosis result, or data of a setting value) of an occurring event. Furthermore, "type" is information representing whether the occurring event is an alarm event or an operation event. By using these "identifier" and "type", an event that has occurred in the field device is represented.

In FIG. 5A, event data of each event (a single event) occurring in the plant is represented in a time series. More specifically, in the first event data illustrated in FIG. 5A, information of each of "date and time"="2016/01/01 10:01:00", "tag name"="TAG2", "identifier"="MAN (Manual) is assigned. In this way, the first event data represents an operation event representing that a field device having tag name="TAG2" performed an operation of switching from an automatic operation mode to a manual operation mode at 10:01:00 on Jan. 1, 2016. More specifically, in the second event data illustrated in FIG. 5A, information of each of "date and time"="2016/01/01 10:03:05", "tag name"="TAG2", "identifier"="MV (Manipulated Variable: operation amount)", and "type"="Operation" is assigned. In this way, the second event data represents an operation event representing that an operation of a setting corresponding to an operation amount was performed for a field device having tag name="TAG2" at 10:03:05 on Jan. 1, 2016. In addition, in the third event data illustrated in FIG. 5A, information of each of "date and time"="2016/01/01 10:04:00", "tag name"="TAG1", "identifier"="HI (High)", and "type"="Alarm" is assigned. In this way, the third event data represents an alarm event representing that an alarm representing that the measured value of a field device having tag name="TAG1" becomes high was issued at 10:04:00 on Jan. 1, 2016. In addition, in the fourth event data illustrated in FIG. 5A, information of each of "date and time"="2016/01/01 10:04:30", "tag name"="TAG2", "identifier"="MV", and "type"="Operation" is assigned. In the fifth event data illustrated in FIG. 5A, information of each of "date and time"="2016/01/01 10:06:30", "tag name"="TAG2", "identifier"="MV", and "type"="Operation" is assigned. In addition, in the sixth event data illustrated in FIG. 5A, information of each of "date and time"="2016/01/01 10:08:00", "tag name"="TAG2", "identifier"="MV", and "type"="Operation" is assigned. By using the fourth to sixth event data, operation events representing that operations of a setting corresponding to an operation amount were performed for a field device having tag name="TAG2" at 10:04:30 on Jan. 1, 2016, at 10:06:30 on Jan. 1, 2016, and at 10:08:00 on Jan. 1, 2016 are represented. In addition, in the seventh event data illustrated in FIG. 5A, information of each of "date and time"="2016/01/01 10:09:00", "tag name"="TAG2". "identifier"="AUT (Automatic)", and "type"="Operation" is assigned. In this way, the seventh event data represents an operation event representing that a field device having tag name="TAG2" performed an operation of switching from a manual operation mode to an automatic operation mode at 10:09:00 on Jan. 1, 2016.

The event data aggregator 102 performs an aggregation process for each event log data as illustrated in FIG. 5A. In the aggregation process performed by the event data aggregator 102, as described above, single events of the same kind repeated within an assumed short period set in advance are arranged into one event having a continuation period in time. In the event data illustrated in FIG. 5A, the operation event data of the second, fourth, fifth, and sixth operation events is considered to be operation event data for a ramping operation performed by an operator having the same intention for a field device having tag name="TAG2", for example, within five minutes. Thus, in description presented below, a case will be considered in which the event data aggregator 102 arranges the operation event data of the second, fourth, fifth, and sixth operation events into one piece of event data (continued event data) to be event data of the same kind through an aggregation process. In this case, the event data aggregator 102 outputs continued event data as illustrated in FIG. 5B.

In each row illustrated in FIG. 5B, each continued event data output by the event data aggregator 102 is represented in a time series. More specifically, in the first continued event data illustrated in FIG. 5B, information of each of "start time"="end time"="2016/01/01 10:01:00", "tag name"="TAG2", "identifier"="MAN", and "type"="Operation" is assigned. This first continued event data is continued event data corresponding to the first operation event data illustrated in FIG. 5A. The first operation event data is operation event data of a single (one time) operation event and thus, is not arranged by the aggregation process, and "date and time"="2016/01/01 10:01:00" assigned to the first operation event data is assigned to both "start time" and "end time". In addition, information of each of "tag name", "identifier" and "type" of the first continued event data is information of a kind of event assigned to the first operation event data. In the second continued event data illustrated in FIG. 5B, information of each of "start time"="2016/01/01 10:03:05" and "end time"="2016/01/01 10:08:00", "tag name"="TAG2", "identifier"="MV", and "type"="Operation" is assigned. This second continued event data is continued event data in which the second, fourth, fifth, and sixth operation event data illustrated in FIG. 5A are arranged through an aggregation process. In the second operation event data. "date and time"="2016/01/01 10:03:05" assigned to the second operation event data is assigned to "start time", and "date and time"="2016/01/01 10:08:00" assigned to the sixth operation event data is assigned to "end time". In addition, information of each of "tag name", "identifier", and "type" of the second continued event data is information of a kind of event assigned to one of the second, fourth, fifth, and sixth operation event data (for example, the second operation event data). In the third continued event data illustrated in FIG. 5B, information of each of "start time"="end time"="2016/01/01 10:04:00", "tag name"="TAG1", "identifier"="HI", and "type"="Alarm" is assigned. This third continued event data is continued event data corresponding to the third alarm event data illustrated in FIG. 5A. The third operation event data is alarm event data of a single (one time) alarm event and thus, is not arranged by the aggregation process, and "date and time"="2016/01/01 10:04:00" assigned to the third operation event data is assigned to both "start time" and "end time", and information of a kind of an event of the third alarm event data is assigned to "tag name", "identifier", and "type". In the fourth continued event data illustrated in FIG. 5B, information of each of "start time"="end time"="2016/01/01 10:09:00", "tag name"="TAG2", "identifier"="AUT", and "type"="Operation" is assigned. This fourth continued event data is continued event data corresponding to the seventh operation event data illustrated in FIG. 5A. The seventh operation event data is operation event data of a single (one time) operation event and thus, "date and time"="2016/01/01 10:09:00" assigned to the seventh operation event data is assigned to both "start time" and "end time", and information of a kind of an event of the seventh operation event data is assigned to "tag name", "identifier", and "type".

In this way, each of the event data collector 101 and the event data aggregator 102 operates, and, from among plurality of pieces of event data included in the event log data acquired from the control system 14, event data of the same kind to be arranged as one piece of event data is arranged through an aggregation process and is converted into one piece of event data having a continuation period in time represented by "start time" to "end time". In addition, each of the event data collector 101 and the event data aggregator 102 repeatedly performs the process of Steps S5 to S6-2 described above regularly.

Referring back to FIG. 3, the continuation of the processing sequence of the causal analysis performed by the event analyzing device 10 will be described.

The event database 11 stores (saves) integrated event data acquired by integrating the process variation event data output from the event data converter 105 and the continued event data output from the event data aggregator 102 (Step S7). In addition, as described above, the processes of Steps S1 to S4-2 performed by the process data collector 103, the trend change detector 104, and the event data converter 105 and the processes of Steps S5 to S6-2 performed by the event data collector 101 and event data aggregator 102 are repeatedly performed asynchronously at a regular timing. Accordingly, the event database 11 further integrates the process variation event data or the continued event data that has been input with the integrated event data that has already been stored (saved) at a timing at which the process variation event data or the continued event data is input and appropriately stores (saved) the integrated event data Here, one example of the integrated event data stored (saved) in the event database 11 will be described. FIG. 6 is a diagram illustrating on example of event data (integrated event data) integrated by the event analyzing device 10 according to an embodiment of the present invention.

In FIG. 6, in each row, one piece of event data of process variation event data integrated with the integrated event data or continued event data (alarm event data or operation event data) is represented in a time series on the basis of "start time". More specifically, the first event data illustrated in FIG. 6 is the first process variation event data illustrated in FIG. 4B. In addition, the second and third event data illustrated in FIG. 6 are the first and second continued event data (operation event data) illustrated in FIG. 5B. Furthermore, the fourth event data illustrated in FIG. 6 is the third continued event data (alarm event data) illustrated in FIG. 5B. In addition, the fifth event data illustrated in FIG. 6 is the fourth continued event data (operation event data) illustrated in FIG. 5B. Furthermore, the sixth event data illustrated in FIG. 6 is the second process variation event data illustrated in FIG. 4B.

In FIG. 6, information each of "start time", "end time", "tag name", "identifier", and "type" is assigned as information representing a kind of each event in the integrated event data. The information representing the type of this event is information assigned to each of the process variation event data (see FIG. 4B) and the continued event data (see FIG. 5B). In this way, by assigning information of the same kind of event to the process variation event data and the continued event data, the event analyzing device 10 can perform a causal analysis combining the process log data and the event log data. In other words, in the event analyzing device 10, the event data converter 105 assigns information representing the kind of event in the same format as that of the continued event data (the alarm event data and the operation event data), and accordingly, a causal analysis can be performed by combining events of variations in various processes performed by each facility arranged inside the plant, an alarm of a facility, an operation for a facility, and the like.

The event analyzing device 10 repeatedly performs the processes of Steps S1 to S7 described above regularly. In addition, in the event analyzing device 10, the processes of Steps S1 to S7 described above may be configured to be performed when the process of a causal analysis to be described below is requested from a user.

Referring back to FIG. 3, the continuation of the processing sequence of the causal analysis performed by the event analyzing device 10 will be described.

A user designates an event (may be a process) of a focused field device for the event analyzing device 10 and requests execution of a causal analysis relating to the designated event (Step S8). In the processing sequence of the event analyzing device 10 illustrated in FIG. 3, although the user's process of Step S8 is illustrated to be performed using the function of the user interface included in the analysis result outputter 107, in the present invention, a method of the process performed by the user in Step S8 is not particularly defined. For example, the user may perform the process of Step S8 by operating the function of an operation device, which is not illustrated in the drawing, included in the display device 13. The process of Step S8 performed by the user is performed asynchronously with the processes of Steps S1 to S7 described above in the event analyzing device 10.

When execution of a causal analysis relating to the designated event is requested from the user, the analysis result outputter 107 outputs the causal analysis execution request to the cause-effect relationship analyzer 106 together with the information of the event of the designated field device (Step S9). In this way, the cause-effect relationship analyzer 106 starts the process of the causal analysis in accordance with the causal analysis execution request output from the analysis result outputter 107.

When the cause-effect relationship analyzer 106 starts the process of the causal analysis, the relation analyzing module 1061 included in the cause-effect relationship analyzer 106 narrows down the relating tag of the designated field device on the basis of the configuration information of the plant such as the P&ID (Step S10-1). Then, the relation analyzing module 1061 acquires all the event data to which the tag name specified by the relating tag is assigned as an identification name from among integrated event data stored (saved) in the event database 11 (Step S10-2). Thereafter, the relation analyzing module 1061 narrows down related events on the basis of each piece of event data acquired from the event database 11 (Step S10-3).

Here, one example of the process (Step S10-3) of narrowing down the related events that is performed by the relation analyzing module 1061 will be described. The relation analyzing module 1061 calculates the continuation period of each event on the basis of the start time and the end time included in each piece of event data acquired from the event database 11, aligns the calculated continuation periods of events on the time axis, and narrows down combinations of events having high degrees of similarity (relation) as related events. The degree of similarity (relation) between events of different two kinds can be calculated on the basis of a conditional probability. A conditional probability between events of two different kinds can be calculated on the basis of the number of times of the occurrence of each event and a count value acquired by counting the number of times of overlapping between sections in which events occur, in other words, the continuation periods of events.

Figure 7:
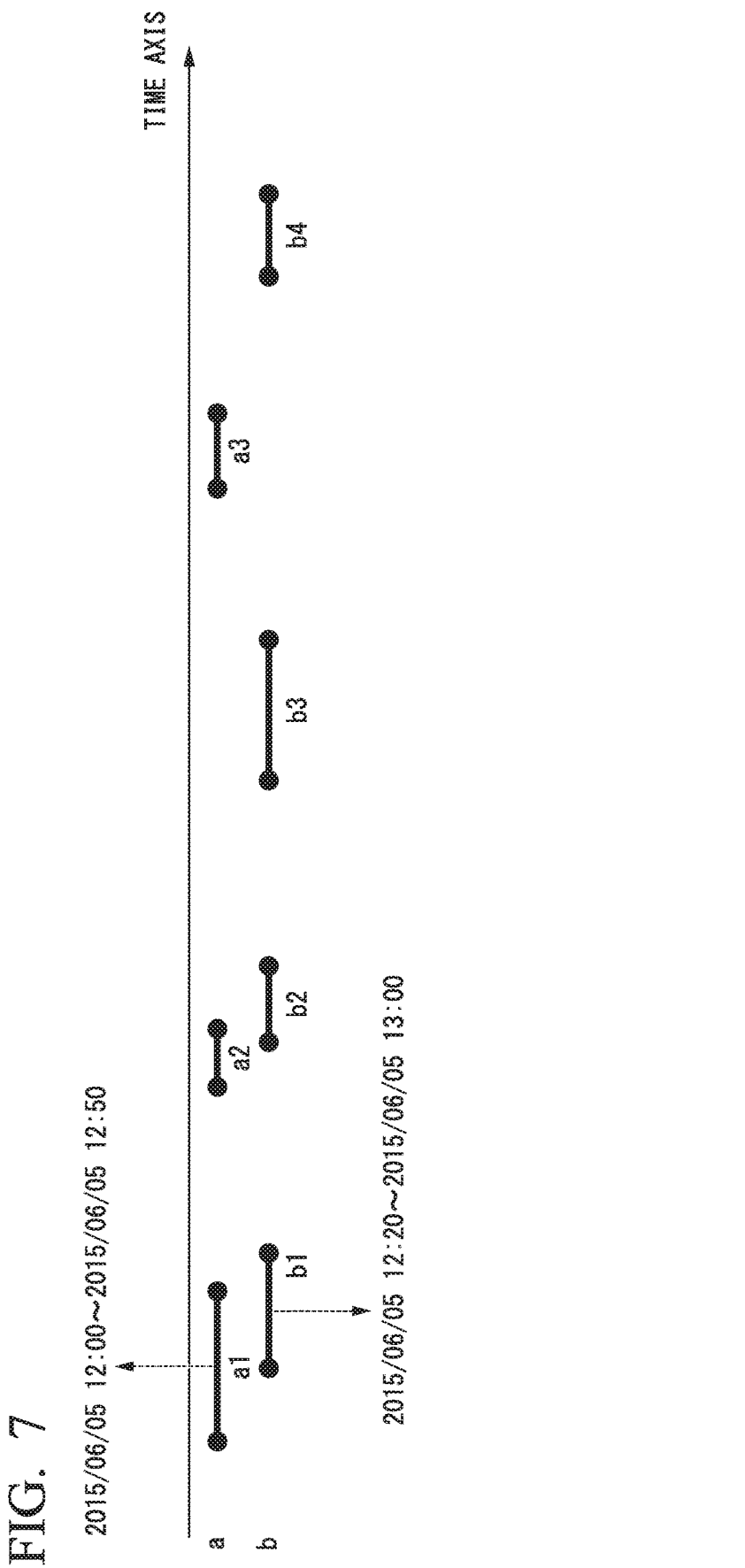
FIG. 7 is a diagram illustrating one example of a process of narrowing down events having strong relation in an event analyzing device according to an embodiment of the present invention.

FIG. 7 is a diagram illustrating one example of the process (Step S10-3) of narrowing down events (related events) having strong relation in the event analyzing device 10 according to an embodiment of the present invention. FIG. 7 illustrates a state in which the continuation periods of events (event a and event b) of different two kinds are aligned on the time axis. More specifically, in a case in which event data of an event a occurring three times is included in event data acquired from the event database 11, the relation analyzing module 1061 arranges time represented by each continuation period (a continuation period a1 to a continuation period a3) of the event a occurring three times to be aligned on the time axis. FIG. 7 illustrates a state in which the continuation period a1 of the event a of the first time arranged on the time axis is between 12:00 on Jun. 5, 2015 and 12:50 on Jun. 5, 2015. In addition, in a case in which event data of an event b occurring four times is included in event data acquired from the event database 11, the relation analyzing module 1061, similar to the event a, arranges times represented by the continuation periods (a continuation period b1 to a continuation period b4) of the event b occurring four times to be aligned on the time axis. FIG. 7 illustrates a state in which the continuation period b1 of the event b of the first time arranged on the time axis is between 12:20 on Jun. 5, 2015 and 13:00 on Jun. 5, 2015.

The relation analyzing module 1061 calculate a conditional probability between the event a and the event b having a relation as illustrated in FIG. 7 and calculates a degree of similarity between the event a and the event b on the basis of the calculated conditional probability. In the example illustrated in FIG. 7, the number of times of occurrence of the event a is three, and the number of times of occurrence of the event b is four. In addition, in the example illustrated in FIG. 7, the number of times of overlapping between the continuation period of the event a and the continuation period of the event b is two including overlapping between the continuation period a1 and the continuation period b1 and overlapping between the continuation period a2 and the continuation period b2. From this, the relation analyzing module 1061 acquires a conditional probability of the occurrence of the event b in a case in which the event a occurs as in the following Equation (1).

$$P(b=1|a=1)=2/3 \tag{1}$$

In addition, similarly, the relation analyzing module 1061 acquires a conditional probability of the occurrence of the event a in a case in which the event b occurs as in the following Equation (2).

$$P(a=1|b=1)=2/4 \tag{2}$$

Then, the relation analyzing module 1061 acquires the degree of similarly between the event a and the event b by using an average value of both the conditional probabilities acquired using Equation (1) and Equation (2) described above.

In this way, the relation analyzing module 1061 acquires the degree of similarity between events of two different kinds for the events of which event data is acquired from the event database 11 and narrows down combinations of events having high degrees of similarity as related events on the basis of the acquired degrees of similarities. Then, the relation analyzing module 1061 outputs the event data of the events narrowed down as the related events among event data acquired from the event database 11 to the cause-effect model building module 1062 included in the cause-effect relationship analyzer 106 as related event data. However, the method of acquiring the degree of similarity used by the relation analyzing module 1061 is not limited to the method using the conditional probabilities described above. For example, the cause-effect relationship analyzer 106 may acquire the degree of similarity on the basis of a correlation coefficient, the amount of mutual information, or the like between events.

Referring back to FIG. 3, the continuation of the processing sequence of the causal analysis performed by the event analyzing device 10 will be described.

The cause-effect model building module 1062 included in the cause-effect relationship analyzer 106 generates (builds) a cause-effect model having information of a cause-effect relationship between events, information of a distribution of differences in the occurrence times of events, and information of a distribution of continuation periods of occurring events on the basis of the related event data output from the relation analyzing module 1061 (Step S10-4).

Here, one example of a building process (Step S10-4) for generating a cause-effect model that is performed by the cause-effect model building module 1062 will be described. The cause-effect model building module 1062 arranges a plurality of blocks representing the same related event as a phenomenon by aligning continuation periods of events on the basis of event data output from the relation analyzing module 1061 on a time axis divided in units of blocks having a reference time width set in advance and generates projected event data including projection data having less folding of information of events included in each phenomenon. Here, as the time width (reference time width) of a block, an appropriate time width is set on the basis of the continuation period of each event included in the related event data. For example, the time width of a block is set as a time width for which a shortest continuation period among the continuation periods of all the events included in the related event data can be represented using at least one block. In addition, as the time width (reference time width) of a block, an appropriate time width may be set in accordance with the accuracy of time in information presented to the user later. Then, the cause-effect model building module 1062 builds a cause-effect model (Bayesian network) having information of a cause-effect relationship between events, information of a distribution of differences in the occurrence times of events, and information of a distribution of continuation periods of occurring events on the basis of the generated projected event data.

Figure 8:
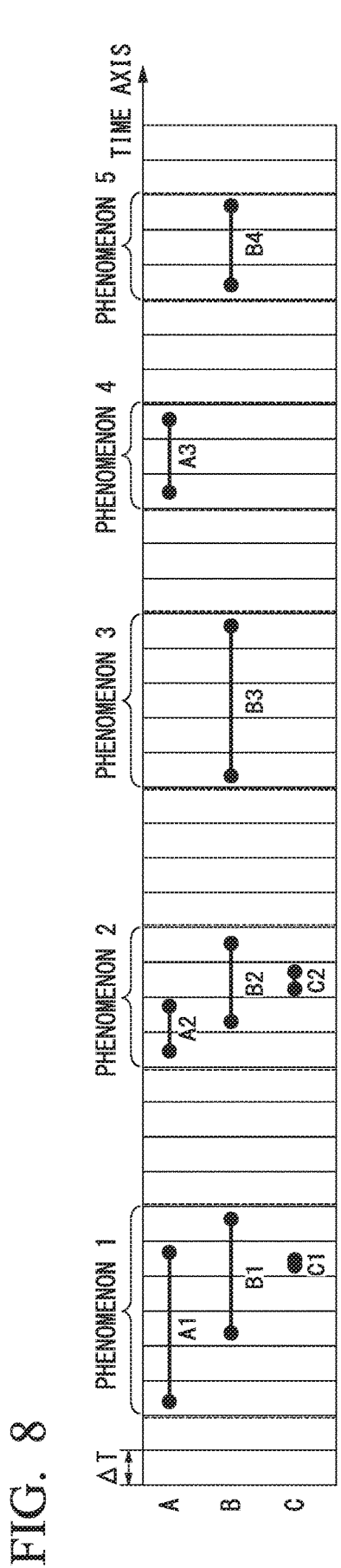
FIG. 8 is a diagram illustrating one example of a process of arranging events having strong relation in an event analyzing device according to an embodiment of the present invention.

First, a process in which the cause-effect model building module 1062 arranges each event included in the related event data output from the relation analyzing module 1061 into a phenomenon will be described. FIG. 8 is a diagram illustrating one example of a process of arranging events (related events) having strong relation in the event analyzing device 10 according to an embodiment of the present invention. FIG. 8 illustrate a state in which the continuation periods of events (event A, event B, and event C) of three different kinds are aligned on a time axis divided in units of blocks having a reference time width set as ΔT in advance More specifically, in a case in which event data of the event A occurred three times is included in the related event data output from the relation analyzing module 1061, the cause-effect model building module 1062 arranges the continuation periods (continuation periods A1 to A3) of the event A occurred three times to be aligned on the time axis divided in units of blocks. In addition, in a case in which event data of the event B occurred four times is included in the related event data output from the relation analyzing module 1061, the cause-effect model building module 1062 arranges the continuation periods (continuation periods B1 to B4) of the event B occurred four times to be aligned on the same time axis. In addition, in a case in which event data of the event C occurred two times is included in the related event data output from the relation analyzing module 1061, the cause-effect model building module 1062 arranges the continuation periods (continuation periods C1 and C2) of the event C occurred two times to be aligned on the same time axis.

The cause-effect model building module 1062 arranges a plurality of blocks in which the continuation periods of events narrowed down into the same related events are arranged on the time axis on which the continuation periods of events are arranged as illustrated in FIG. 8 as one "phenomenon". In the example illustrated in FIG. 8, a state is illustrated in which a plurality of blocks in which the continuation period A1 of the event A of the first time, the continuation period B 1 of the event B of the first time, and the continuation period C1 of the event C of the first time narrowed down to the same related events are arranged as "phenomenon 1". In addition, in the example illustrated in FIG. 8, a state is illustrated in which a plurality of blocks in which the continuation period A2 of the event A of the second time, the continuation period B2 of the event B of the second time, and the continuation period C2 of the event C of the second time narrowed down to the same related events are arranged as "phenomenon 2". Similarly, in the example illustrated in FIG. 8, a state is illustrated in which a plurality of blocks in which the continuation period B3 of the event B of the third time is arranged as "phenomenon 3", a plurality of blocks in which the continuation period B3 of the event A of the third time is arranged as "phenomenon 4", and a plurality of blocks in which the continuation period B4 of the event B of the fourth time is arranged as "phenomenon 5".

As illustrated in FIG. 8, although there are cases in which the continuation period of each event is arranged over a plurality of blocks, there are cases in which the continuation period is arranged only in one block. As illustrated in FIG. 8, for continuation periods of the same event, the number of blocks in which a continuation period is arranged is different for each of the continuation periods. In addition, as illustrated in FIG. 8, the number of blocks configuring each phenomenon is different for each phenomenon. The reason for this is that each event having a continuation period included in the related event data has a large time variation, and thus, there is a large time difference between the continuation periods of each event and between those of different events. Thus, the cause-effect model building module 1062 folds information of events arranged in each phenomenon into projected data to be small such that a causal analysis between events having large variations in a time difference can be performed, in other words, a causal analysis between events can be performed without being influenced by variations in a time difference and generates projected event data represented by this projected data.

Figure 9:
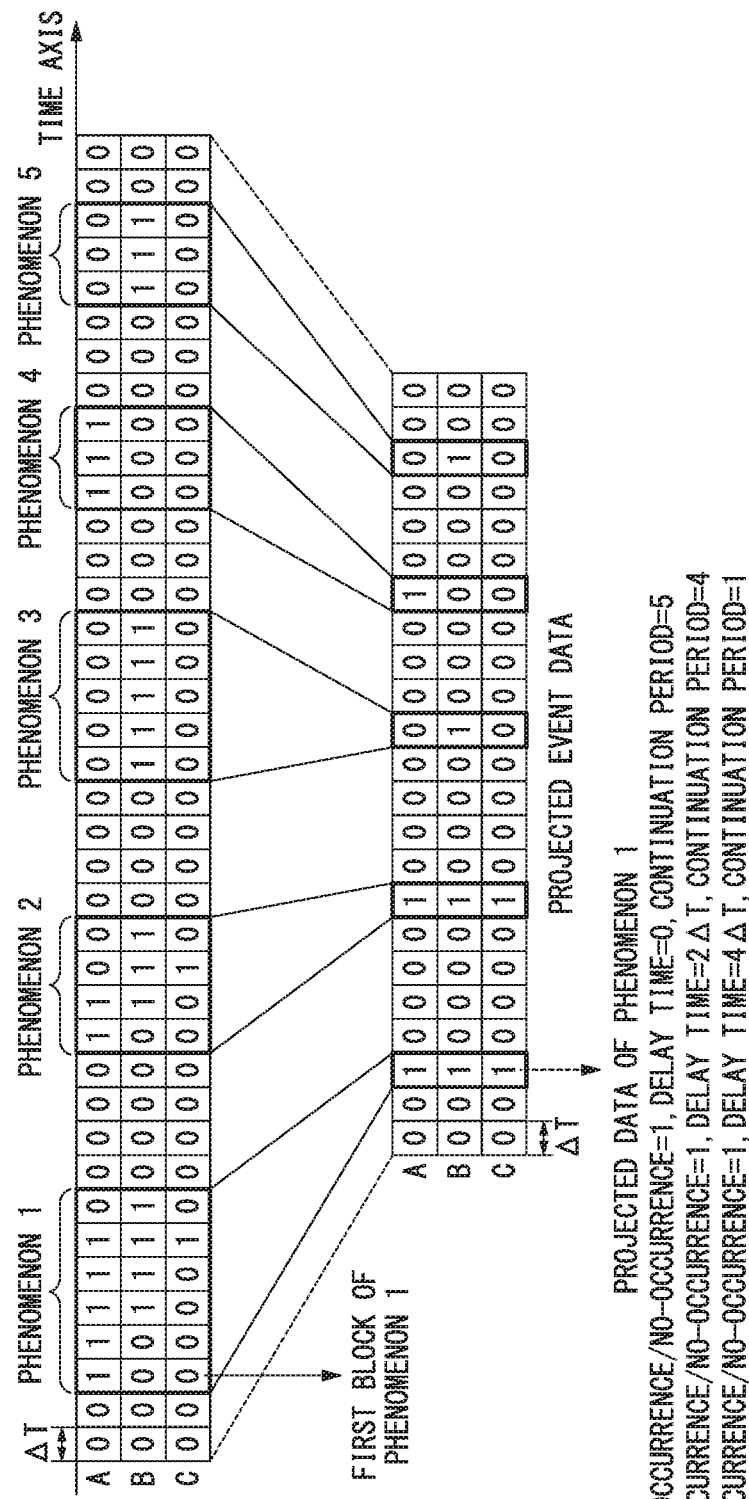
FIG. 9 is a diagram illustrating one example of a process of generating event data for building a cause-effect model in an event analyzing device according to an embodiment of the present invention.

Subsequently, the process of generating projected event data including projected data that is performed by the cause-effect model building module 1062 will be described. FIG. 9 is a diagram illustrating one example of a process of generating event data (projected event data) for building a cause-effect model (Bayesian network) in the event analyzing device 10 according to an embodiment of the present invention. FIG. 9 illustrates the process of generating projected event data including projected data corresponding to each phenomenon by folding information of each event, which is narrowed down into the same related events represented by a plurality of blocks configuring each phenomenon arranged in the process illustrated in FIG. 8, to be less. In an upper stage of FIG. 9, information of blocks representing an arrangement state of the continuation period of each event arranged on the time axis in the process illustrated in FIG. 8. In a lower stage of FIG. 9, projected event data generated by folding information represented by a plurality of blocks configuring each phenomenon illustrated in the upper stage of FIG. 9 to be small to be included in corresponding projected data.

As illustrated in the upper stage in FIG. 9, the arrangement state of the continuation periods of three different kinds of events (event A, event B, and event C) arranged on the time axis can be represented based on whether or not a continuation period is arranged in each block. In the upper stage in FIG. 9, the arrangement state of continuation periods of events in each block is represented with data of a case in which the continuation period of an event is arranged represented as "1" and data of a case in which the continuation period of an event is not arranged represented as "0". For example, in a phenomenon 1 for an event A represented in the upper stage in FIG. 9, the first to fifth blocks represent the continuation period of the event A, and thus, data of each of five blocks of the first to fifth blocks is represented as "1", and data of the other block (the sixth block) is represented as "0". Similarly, in the phenomenon 1 for an event B represented in the upper stage in FIG. 9, the third to sixth blocks represent the continuation period of the event B, and thus, data of each of four blocks of the third to sixth blocks is represented as "1", and data of the other blocks (the first and second blocks) is represented as "0". Similarly, in the phenomenon 1 for an event C represented in the upper stage in FIG. 9, only the fifth block represents the continuation period of the event C, and thus, data of only the fifth block is represented as "1", and data of the other blocks (the first to fourth blocks and the sixth block) is represented as "0".

Then, the cause-effect model building module 1062 generates projected event data including projected data having the configuration as illustrated in the lower stage in FIG. 9 by folding information represented by a plurality of blocks configuring a phenomenon to be small so as to be projected into the first block in each phenomenon. As described above, in each projected data, information of occurrence/no-occurrence of an event, a time difference between events, and the continuation period of each event is included. The information of the occurrence/no-occurrence of an event in each projected data is represented as "1" in a case in which an event occurs, in other words, the continuation period of an event is arranged in any one block and is represented as "0" in a case in which the continuation period of an event is not arranged in any block. In addition, the information of a time difference between events in each projected data is represented as multiples of a reference time width=$\Delta T$ by using the number of blocks from the first block to a block in which the continuation period of an event is arranged in each phenomenon as a delay time from the first block. In addition, the information of the continuation period of an event in each projected data is represented as the number of blocks in which the continuation period of the event is arranged. For example, as illustrated in the lower stage in FIG. 9, for projected data corresponding to the phenomenon 1 in the event A illustrated in the upper stage in FIG. 9, the continuation period of the event A is arranged in five blocks including the first to fifth blocks, and accordingly, the occurrence/no-occurrence of an event="1" (occurrence of an event), delay time="0", and the continuation period="5". Similarly, for projected data corresponding to the phenomenon 1 in the event B illustrated in the upper stage in FIG. 9, there is a delay of two blocks including the first and second blocks, the continuation period of the event B is arranged in four blocks including the third to sixth blocks, and accordingly, the occurrence/no-occurrence of an event="1" (occurrence of an event), delay time="$2\Delta T$", and the continuation period="4". Similarly, for projected data corresponding to the phenomenon 1 in the event C illustrated in the upper stage in FIG. 9, there is a delay of four blocks including the first to fourth blocks, the continuation period of the event C is arranged only in the fifth block, and accordingly, the occurrence/no-occurrence of an event="1" (occurrence of an event), delay time="$4\Delta T$", and the continuation period="1".

In addition, as illustrated in the lower stage in FIG. 9, on the time axis illustrated in the upper stage in FIG. 9, each block in which the continuation period of a certain block is not arranged is included in the projected event data as projected data.

Figure 10:
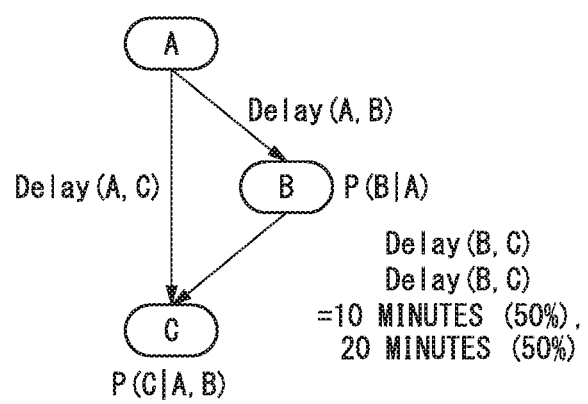
FIG. 10 is a diagram illustrating one example of a cause-effect model built by an event analyzing device according to an embodiment of the present invention.

Subsequently, the process of building a cause-effect model (Bayesian network) on the basis of the generated projected event data that is performed by the cause-effect model building module 1062 will be described. In addition, the cause-effect model building module 1062 can build a Bayesian network having information enabling acquisition of a cause-effect relationship between events by using an algorithm similar to an algorithm used when a conventional event analyzing device builds a Bayesian network such as an MWST method, k2, or the like. The reason for this is that, as described above, by including a time factor as one event in projected event data, a special configuration is not necessary in the algorithm used for building a Bayesian network. Thus, in description presented below, detailed description relating to a method of building a Bayesian network having information used for acquiring a cause-effect relationship between events using the cause-effect model building module 1062 will not be presented, and one example of a Bayesian network built by the cause-effect model building module 1062 will be described. FIG. 10 is a diagram illustrating one example of a cause-effect model (Bayesian network) built by the event analyzing device 10 according to an embodiment of the present invention. FIG. 10 illustrates one example of the Bayesian network generated on the basis of the projected event data illustrated in the lower stage in FIG. 9.

The cause-effect model building module 1062, by including time factors of a delay time of a corresponding phenomenon and a continuation period as events of the projected event data, enables a building Bayesian network to have information used for acquiring a distribution of time differences between events and a distribution of continuation periods of events for all the events. In the example of the Bayesian network illustrated in FIG. 10, A to C respectively corresponds to the events A to C included in the projected event data illustrated in the lower stage in FIG. 9. In the example of the Bayesian network illustrated in FIG. 10, in a case in which the event A occurs, the event B occurs at the probability of "P(B|A)", and a delay time at that time is represented as "Delay (A, B)". In addition, in the example of the Bayesian network illustrated in FIG. 10, in a case in which the event B occurs in accordance with the occurrence of the event A, the event C further occurs at the probability of "P(C|A, B)", and a delay time at that time is represented as "Delay (B, C)". Furthermore, in the example of the Bayesian network illustrated in FIG. 10, a delay time of the event C with respect to the event A is represented as "Delay (A, C)".

In a case in which a certain event occurs in accordance with the Bayesian network of the example illustrated in FIG. 10, a delay time and a continuation period when another event having a cause-effect relationship with this event occurs can be acquired with conditional probabilities. For example, in the projected event data illustrated in the lower stage in FIG. 9, in the phenomenon 1, since the delay time of the event B at the time of the occurrence of the event A is delay time="2ΔT", and the delay time of the event C="4ΔT", it can be known that a delay time (time difference) until the event C occurs after the occurrence of the event B is delay time="2ΔT". In addition, in the projected event data illustrated in the lower stage in FIG. 9, in the phenomenon 2, since the delay time of the event B at the time of the occurrence of the event A is delay time="ΔT", and the delay time of the event C="2ΔT", it can be known that a delay time (time difference) until the event C occurs after the occurrence of the event B is delay time="ΔT". At this time, when the reference time width ΔT is set as ΔT="10 minutes", the event B occurs in accordance with the occurrence of the event A, and a delay time between the event B and the event C when the event C further occurs is a delay time "Delay (B, C), and it can be acquired that the probability that the delay time="ΔT"="10 minutes" is 50%, and the probability that the delay time="2ΔT"="20 minutes" is 50%.

In this way, the cause-effect model building module 1062 generates projected event data including information of each event narrowed down into the same related events as projected data on the basis of the related event data output from the relation analyzing module 1061. Thereafter, the cause-effect model building module 1062 builds a cause-effect model (Bayesian network) having information used for acquiring a cause-effect relationship between events, a distribution of differences (delay times) in the occurrence times of events, and a distribution of continuation periods of events on the basis of the generated projected event data. Then, the cause-effect model building module 1062 outputs the built cause-effect model (Bayesian network) to the cause-effect model database 12 so as to be stored (saved) therein.

Referring back to FIG. 3, the continuation of the processing sequence of the causal analysis performed by the event analyzing device 10 will be described.

The causal analysis module 1063 included in the cause-effect relationship analyzer 106 performs a causal analysis relating to the event designated in Step S8 on the basis of the cause-effect model (Bayesian network) stored (saved) in the cause-effect model database 12 (Step S10-5). In a causal analysis performed by the causal analysis module 1063, on the basis of the Bayesian network generated by the cause-effect model building module 1062, similar to a causal analysis performed using a Bayesian network in a conventional event analyzing device, an analysis of a cause-effect relationship between events such as estimation of a cause of the occurrence of the designated event and a prediction of the occurrence of another event caused by the designated event is performed. At this time, in the Bayesian network used by the causal analysis module 1063 for a causal analysis, similar to a Bayesian network generated by a conventional event analyzing device, not only events (an alarm event and an operation event) occurring in a facility but also a variation in the process value in a process performed by the facility is included as an event (process variation event). For this reason, in the causal analysis performed by the causal analysis module 1063, not only a prediction of the occurrence of an alarm event or an operation event caused by the designated event but also estimation of a cause of the occurrence of a process variation event, prediction of the occurrence of another event (including a process variation event) caused by the process variation event, in other words, estimation or prediction of the occurrence of future variations in various processes performed by each facility arranged inside a pant is performed as an analysis of a cause-effect relationship. In addition, the Bayesian network generated by the cause-effect model building module 1062, as described above, has information used for not only acquiring a cause-effect relationship between events, but also a distribution of differences (delay times) in the occurrence times of events, and a distribution of continuation periods of events. For this reason, in a causal analysis performed by the causal analysis module 1063, a distribution of occurrence time differences (delay times) of other events caused by the designated event and a distribution of continuation periods of the events are calculated, and the occurrence probabilities of other estimated or predicted events can be calculated (estimated). For the estimation of the occurrence probabilities of other events estimated or predicted by the causal analysis module 1063, the probability reasoning of the Bayesian network can be used. As representative probability reasoning algorithms of the Bayesian network, there are a probability propagation method and the like. In a causal analysis performed by the causal analysis module 1063, on the basis of the occurrence time of the designated event, the distribution of occurrence time differences (delay times) of other events and the distribution of continuation periods of the events that are calculated, the occurrence times and the continuation periods of other estimated or predicted events can be calculated (estimated). In addition, as a method of the causal analysis performed by the causal analysis module 1063, an existing method may be appropriately used, and thus detailed description thereof will not be presented.

In this way, the causal analysis module 1063, on the basis of the Bayesian network generated by the cause-effect model building module 1062, performs a causal analysis such as estimation of a cause of the occurrence of the designated event, prediction of the occurrences of other events caused by the designated event, and estimation of the occurrence probabilities, the occurrence times, and the continuation periods of other events. Then, the causal analysis module 1063 outputs result of estimation (results of causal analyses) to the analysis result outputter 107. In this way, the analysis result outputter 107 generates display data visualizing information of the result of the causal analysis output from the causal analysis module 1063 and outputs the generated display data to the display device 13, thereby causing the display device 13 to display a display screen corresponding to the display data.

According to the flow (processing sequence) of such a process, the event analyzing device 10 performs a causal analysis relating to the event designated by the user and causes the display device 13 to display a result of the causal analysis to be presented, thereby supporting a user managing the operations of facilities.

As described above, according to an embodiment of the present invention, the event analyzing device (more particularly, the process data collector 103, the trend change detector 104, and the event data converter 105) acquires process data of various processes performed by each facility arranged inside a plant and converts the acquired process data into event data (process variation event data) having a continuation period in time representing variations in the acquired process data. In addition, in an embodiment of the present invention, the event analyzing device (more specifically, the event data collector 101) acquires event data of a single event such as event data (alarm event data) of an event of an alarm (alarm event) occurring in each facility arranged inside the plant or event data (operation event data) of an event of an operation (operation event) performed for each facility. At this time, in an embodiment of the present invention, in a case in which acquisition of event data of events of the same kind issued within a period (assumed short period) set in advance is repeated a plurality of number of times, the event analyzing device (more specifically, the event data aggregator 102) arranges (aggregates) a plurality of pieces of event data of the same kind that have been repeatedly acquired as event data (continued event data) of one event having a continuation period in time. Then, in an embodiment of the present invention, the event analyzing device integrates (more specifically, integrates event data at the time of storing (saving) it in the event database 11) event data (process variation event data) acquired by converting process data and event data (continued event data) arranged as the event data of one event and sets the integrated data as new event data (integrated event data). Then, in an embodiment of the present invention, the event analyzing device (more specifically, the cause-effect relationship analyzer 106), on the basis of the integrated event data (integrated event data), after narrowing down related event data (related event data), handles this event data similar to event data used in a conventional event analyzing device and builds a cause-effect model (Bayesian network) for analyzing a cause-effect relationship. In this way, in an embodiment of the present invention, the event analyzing device (more specifically, the cause-effect relationship analyzer 106) processes the built cause-effect model (Bayesian network) similar to a cause-effect model used for analyzing a cause-effect relationship in a conventional event analyzing device, thereby executing a causal analysis. In this way, in an embodiment of the present invention, the event analyzing device (more specifically, the event analyzing device 10) combines events of variations in the process data performed by each facility arranged inside the plant, an alarm of a facility, an operation for a facility, and the like and can analyze a cause-effect relationship.

In addition, in an embodiment of the present invention, the event analyzing device (more specifically, the cause-effect model building module 1062 included in the cause-effect relationship analyzer 106) includes information of a continuation period in time in event data (the process variation event data, the alarm event data, and the operation event data) of each event included in event data (integrated event data) used for building a cause-effect model (Bayesian network). For this reason, in an embodiment of the present invention, the event analyzing device (more specifically, the causal analysis module 1063 included in the cause-effect relationship analyzer 106) can perform a causal analysis in which a time concept considered (applied). More specifically, in a result of the causal analysis, a distribution (a distribution of time differences when an event occurs or a distribution of continuation periods of each occurring event) relating to a time, the occurrence probability, the occurrence time, the continuation period, and the like of an event can be calculated (estimated).

In this way, in an embodiment of the present invention, compared to a conventional case, various information can be presented to the user using the event analyzing device (more specifically the event analyzing device 10), and the management of operations of facilities that is performed by the user can be supported. For example, a user explains about a manual operation performed for a facility and variations in the process data that is a cause of an alarm generated in a facility, whereby automation of the operation performed by the operator or rationalization for decreasing the number of times of generating an alarm can be performed, and the operation of the plant can be improved. In addition, for example, a user specifies a cause by tracing chains of abnormalities propagating through a plurality of facilities, whereby a safe operation of the plant can be achieved.

In an embodiment, a case in which a Bayesian network is built as a cause-effect model on the basis of integrated event data has been described. However, a cause-effect model built by the event analyzing device according to the present invention is not limited to the Bayesian network, and the idea of the present invention can be applied to a cause-effect model, similar to the Bayesian network illustrated in the embodiment, that can be built on the basis of the integrated event data and can analyze a cause-effect relationship in which a time concept is considered (applied).

In addition, for example, by recording a program used for realizing the processes performed by the event analyzing device 10 illustrated in FIG. 1 and each constituent element configuring the event analyzing device 10 in a computer readable storage medium and causing the program recorded in the storage medium to be read and executed by a computer system, various processes according to this embodiment described above may be performed. The "computer system" described here may include an OS and hardware such as a peripheral apparatus. In a case in which a WWW system is used, the "computer system" is assumed to also include a homepage providing environment (or display environment). The "computer readable storage medium" represents a storage device such as a writable non-volatile memory including a flexible disk, a magneto-optical disk, a ROM, and a flash memory, a portable medium such as a CD-ROM, or a hard disk or the like built into a computer system.

Furthermore, the "computer readable storage medium" includes a medium storing a program for a fixed time such as a volatile memory (for example, a dynamic random access memory (DRAM)) disposed inside a computer system that becomes a server or a client in a case in which a program is transmitted through a network such as the internet or a communication line such as a telephone line. The program described above may be transmitted from a computer system storing this program in a storage device or the like to another computer system through a transmission medium or a transmission wave in a transmission medium. Here, the "transmission medium" transmitting a program represents a medium having an information transmitting function such as a network including the Internet and the like or a communication line including a telephone line. The program described above may be used for realizing a part of the functions described above. In addition, the program described above may be a program realizing the functions described above by being combined with a program recorded in the computer system in advance, a so-called a differential file (differential program).

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An event analyzing device for analyzing events occurring in a plurality of devices that are operational within a plant, the event analyzing device comprising:
    a hardware-processor configured to execute an event analyzing program to implement:
    an event data collector configured to collect event data which represents an event including an alarm which has occurred in at least one of the plurality of devices in the plant and an operation performed to the plurality of devices;
    an event data aggregator configured to determine event data of the collected event data having a same identification name, same parameters and a same type, as event data corresponding to a same event, and configured to arrange the determined event data as one piece of the event data to generate continued event data comprising a start time and an end time of the event;
    a process data collector configured to collect process data of the plurality of devices in the plant;
    a trend change detector configured to detect a trend change of the process data collected by the process data collector;
    an event data converter configured to convert the trend change detected by the trend change detector into process change event data representing a process change event represented in a format similar to the event data collected by the event data collector; and
    a cause-effect relationship analyzer configured to integrate the continued event data generated by the event data aggregator and the process change event data converted by the event data converter to analyze a cause-effect relationship between the event and the process change event
    wherein the cause-effect relationship analyzer is configured to build a cause-effect model representing the cause-effect relationship analyzed by the cause-effect relationship analyzer, a distribution of delay times, and a distribution of continuation periods, and
    wherein the cause-effect relationship analyzer is configured to predict an abnormality of the plant from the event data collected by the event data collector or from the trend change of the process data based on the cause-effect model built by the cause-effect relationship analyzer.

2. The event analyzing device according to claim 1, wherein the trend change detector is configured to analyze the process data collected by the process data collector to detect a period of the trend change.

3. The event analyzing device according to claim 1, wherein the event data converter is configured to convert the trend change detected by the trend change detector into the process change event data having the trend change represented as a continuous period.

4. The event analyzing device according to claim 1, wherein the cause-effect relationship analyzer is configured to estimate the trend change of the process data, which is a cause of an occurrence of the event represented by the event data collected by the event data collector, based on the cause-effect model built by the cause-effect relationship analyzer.

5. The event analyzing device according to claim 1, wherein the cause-effect relationship analyzer is configured to estimate the trend change of the process data in a future from the event data collected by the event data collector based on the cause-effect model built by the cause-effect relationship analyzer.

6. An event analyzing system for analyzing events occurring in a plurality of devices that are operational within a plant, the event analyzing system comprising:
    an event analyzing device which analyzes events occurring in the plurality of devices that are operational within the plant, wherein the event analyzing device comprises a hardware-processor configured to execute an event analyzing program to implement
    an event data collector configured to collect event data which represents an event including an alarm which has occurred in at least one of the plurality of devices in the plant and an operation performed to the plurality of devices;
    an event data aggregator configured to determine event data of the collected event data having a same identification name, same parameters and a same type, as event data corresponding to a same event, and configured to arrange the determined event data as one piece of the event data to generate continued event data comprising a start time and an end time of the event;
    a process data collector configured to collect process data of the plurality of devices in the plant;
    a trend change detector configured to detect a trend change of the process data collected by the process data collector;
    is replaced by "an event data converter configured to convert the trend change detected by the trend change detector into process change event data representing a process change event represented in a format similar to the event data collected by the event data collector; and
    a cause-effect relationship analyzer configured to integrate the continued event data generated by the event data aggregator and the process change event data converted by the event data converter to analyze a cause-effect relationship between the event and the process change event
    wherein the cause-effect relationship analyzer is configured to build a cause-effect model representing the cause-effect relationship analyzed by the cause-effect relationship analyzer, a distribution of delay times, and a distribution of continuation periods, and
    is replaced by "wherein the cause-effect relationship analyzer is configured to predict an abnormality of the plant from the event data collected by the event data collector or from the trend change of the process data based on the cause-effect model built by the cause-effect relationship analyzer.

7. The event analyzing system according to claim 6, wherein the trend change detector is configured to analyze the process data collected by the process data collector to detect a period of the trend change.

8. The event analyzing system according to claim 6, wherein the event data converter is configured to convert the trend change detected by the trend change detector into the process change event data having the trend change represented as a continuous period.

9. An event analyzing method performed by an event analyzing device for analyzing events occurring in a plurality of devices that are operational within a plant, the event analyzing device comprising a hardware-processor configured to execute an event analyzing program, the event analyzing method comprising:
   collecting, by an event data collector, event data which represents an event including an alarm which has occurred in at least one of the plurality of devices in the plant and an operation performed to the plurality of devices;
   determining, by an event data aggregator, event data of the collected event data having a same identification name, same parameters and a same type, as event data corresponding to a same event, and arranging, by the event data aggregator, the determined event data as one piece of the event data to generate continued event data comprising a start time and an end time of the event;
   collecting, by a process data collector, process data of the plurality of devices in the plant;
   detecting, by a trend change detector, a trend change of the process data collected by the process data collector;
   converting, by an event data converter, the trend change detected by the trend change detector into process change event data representing a process change event represented in a format similar to the event data collected by the event data collector
   integrating, by a cause-effect relationship analyzer, the continued event data generated by the event data aggregator and the process change event data converted by the event data converter to analyze a cause-effect relationship between the event and the process change event
   building, by the cause-effect relationship analyzer, a cause-effect model representing the cause-effect relationship analyzed by the cause-effect relationship analyzer, a distribution of delay times, and a distribution of continuation periods; and
   predicting, by the cause-effect relationship analyzer, an abnormality of the plant from the event data collected by the event data collector or from the trend change of the process data based on the cause-effect model built by the cause-effect relationship analyzer.

10. A non-transitory computer readable storage medium storing one or more event analyzing programs configured for execution by an event analyzing device for analyzing events occurring in a plurality of devices that are operational within a plant, the event analyzing device comprising a hardware-processor configured to execute the one or more event analyzing programs, the one or more event analyzing programs comprising instructions for at least:
   collecting, by an event data collector, event data which represents an event including an alarm which has occurred in the plurality of devices in the plant and an operation performed to the plurality of devices;
   determining, by an event data aggregator, event data having a same identification name, same parameters and a same type, as event data corresponding to a same event, and arranging, by the event data aggregator, the determined event data as one piece of the event data to generate continued event data comprising a start time and an end time of the event;
   collecting, by a process data collector, process data of the plurality of devices in the plant;
   detecting, by a trend change detector, a trend change of the process data collected by the process data collector;
   converting, by an event data converter, the trend change detected by the trend change detector into process change event data representing a process change event represented in a format similar to the event data collected by the event data collector
   integrating, by a cause-effect relationship analyzer, the continued event data generated by the event data aggregator and the process change event data converted by the event data converter to analyze a cause-effect relationship between the event and the process change event
   building, by the cause-effect relationship analyzer, a cause-effect model representing the cause-effect relationship analyzed by the cause-effect relationship analyzer, a distribution of delay times, and a distribution of continuation periods; and
   predicting, by the cause-effect relationship analyzer, an abnormality of the plant from the event data collected by the event data collector or from the trend change of the process data based on the cause-effect model built by the cause-effect relationship analyzer.

* * * * *